United States Patent
Nagaraja et al.

(10) Patent No.: US 11,088,769 B2
(45) Date of Patent: Aug. 10, 2021

(54) RADIO LINK MONITORING BASED ON MULTIPLE REFERENCE SIGNALS

(71) Applicant: QUALCOMM Incorporated, San Diego, CA (US)

(72) Inventors: Sumeeth Nagaraja, San Diego, CA (US); Tao Luo, San Diego, CA (US); Wooseok Nam, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 132 days.

(21) Appl. No.: 16/019,214

(22) Filed: Jun. 26, 2018

(65) Prior Publication Data

US 2019/0058532 A1 Feb. 21, 2019

Related U.S. Application Data

(60) Provisional application No. 62/547,674, filed on Aug. 18, 2017.

(51) Int. Cl.
*H04W 72/04* (2009.01)
*H04B 17/24* (2015.01)
(Continued)

(52) U.S. Cl.
CPC .......... *H04B 17/24* (2015.01); *H04B 17/318* (2015.01); *H04L 1/20* (2013.01); *H04L 5/006* (2013.01);
(Continued)

(58) Field of Classification Search
CPC ......... H04L 1/20; H04L 5/0048; H04L 5/005; H04L 5/0051; H04L 5/0053; H04L 5/006; H04W 24/08; H04W 24/10; H04W 76/28
See application file for complete search history.

(56) References Cited

U.S. PATENT DOCUMENTS

| 8,934,365 B2 * | 1/2015 | Medles | H04B 17/309 370/252 |
| 9,025,556 B2 * | 5/2015 | Krishnamurthy ... | H04W 72/082 370/329 |

(Continued)

FOREIGN PATENT DOCUMENTS

WO    WO-2017138869 A1    8/2017

OTHER PUBLICATIONS

International Search Report and Written Opinion—PCT/US2018/039705—ISA/EPO—dated Oct. 4, 2018.

*Primary Examiner* — Phuc H Tran
(74) *Attorney, Agent, or Firm* — Holland & Hart LLP; Nerrie M. Zohn

(57) ABSTRACT

Methods, systems, and devices for wireless communication are described. In some wireless communications systems, a user equipment (UE) may support techniques for monitoring the quality of a radio link with a base station (e.g., radio link monitoring (RLM)). If the UE determines that the quality of the radio link is too low, the UE may declare that there is a radio link failure (RLF), and the UE may take action to reconnect with the base station or connect with a different base station. As described herein, the UE may monitor the quality of the radio link by monitoring the quality of multiple reference signals of different types received from the base station. In one example, the UE may be configured by the base station to use one or more specific reference signals for performing RLM based on the quality of different types of reference signals received by the UE.

30 Claims, 13 Drawing Sheets

(51) Int. Cl.
*H04L 1/20* (2006.01)
*H04L 5/00* (2006.01)
*H04W 56/00* (2009.01)
*H04B 17/318* (2015.01)
*H04W 24/08* (2009.01)
*H04W 24/10* (2009.01)
*H04W 76/28* (2018.01)

(52) U.S. Cl.
CPC .......... *H04L 5/0048* (2013.01); *H04L 5/0053* (2013.01); *H04W 24/08* (2013.01); *H04W 24/10* (2013.01); *H04W 56/001* (2013.01); *H04L 5/005* (2013.01); *H04L 5/0051* (2013.01); *H04W 76/28* (2018.02)

(56) References Cited

U.S. PATENT DOCUMENTS

| | | | | |
|---|---|---|---|---|
| 10,419,962 | B2* | 9/2019 | Axmon | H04W 52/0212 |
| 10,721,024 | B2* | 7/2020 | Seo | H04L 1/1819 |
| 2013/0250782 | A1* | 9/2013 | Nimbalker | H04L 1/203 |
| | | | | 370/252 |
| 2013/0252606 | A1* | 9/2013 | Nimbalker | H04B 17/309 |
| | | | | 455/434 |
| 2013/0301542 | A1 | 11/2013 | Krishnamurthy et al. | |
| 2013/0308472 | A1* | 11/2013 | Medles | H04B 17/309 |
| | | | | 370/252 |
| 2013/0308485 | A1* | 11/2013 | Krishnamurthy | H04W 72/082 |
| | | | | 370/252 |
| 2017/0230780 | A1 | 8/2017 | Chincholi et al. | |
| 2018/0192313 | A1* | 7/2018 | Axmon | H04B 17/318 |
| 2018/0324659 | A1* | 11/2018 | Tabet | H04B 17/382 |
| 2018/0343595 | A1* | 11/2018 | da Silva | H04J 11/0073 |
| 2019/0052443 | A1* | 2/2019 | Cheng | H04L 5/0007 |
| 2019/0089579 | A1* | 3/2019 | Sang | H04W 40/36 |
| 2019/0141557 | A1* | 5/2019 | da Silva | H04W 76/18 |
| 2019/0158155 | A1* | 5/2019 | Park | H04B 7/04 |
| 2019/0174385 | A1* | 6/2019 | Sang | H04W 76/27 |
| 2019/0260487 | A1* | 8/2019 | Kazmi | H04B 17/382 |
| 2019/0261344 | A1* | 8/2019 | Grant | H04B 7/088 |
| 2020/0127726 | A1* | 4/2020 | Gao | H04L 1/0026 |
| 2020/0221328 | A1* | 7/2020 | da Silva | H04B 7/0617 |
| 2020/0260430 | A1* | 8/2020 | Grant | H04B 7/088 |
| 2020/0274657 | A1* | 8/2020 | Deenoo | H04L 1/0026 |

* cited by examiner

US 11,088,769 B2

RADIO LINK MONITORING BASED ON MULTIPLE REFERENCE SIGNALS

CROSS REFERENCES

The present Application for Patent claims the benefit of U.S. Provisional Patent Application No. 62/547,674 by NAGARAJA, et al., entitled "RADIO LINK MONITORING BASED ON MULTIPLE REFERENCE SIGNALS," filed Aug. 18, 2017, assigned to the assignee hereof, and expressly incorporated by reference herein.

BACKGROUND

The following relates generally to wireless communication and more specifically to radio link monitoring (RLM) based on multiple reference signals.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may support techniques for monitoring the quality of a radio link with a cell (e.g., RLM). If the UE determines that the quality of the radio link is too low, the UE may declare that there is radio link failure (RLF), and the UE may, in some examples, attempt to reconnect with the cell or initiate a cell selection procedure to find a new cell associated with a suitable radio link. In some cases, the UE may perform RLM based on reference signals of a particular type. However, such reference signals may not be transmitted by the base station consistently, and, in some examples, the UE may not have access to sufficient (or any) reference signals to perform RLM.

SUMMARY

In some wireless communications systems, a user equipment (UE) may support techniques for monitoring the quality of a radio link with a base station (e.g., radio link monitoring (RLM)). If the UE determines that the quality of the radio link is too low, the UE may declare that there is a radio link failure (RLF), and the UE may take action to reconnect with the base station or connect with a different base station. As described herein, the UE may monitor the quality of the radio link by monitoring the quality of multiple reference signals of different types received from the base station. In one example, the UE may be configured by the base station to use one or more of the different types of reference signals for performing RLM based on various factors or conditions of the different types of reference signals received by the UE. In some cases, the techniques may enhance RLM and may therefore reduce the instances of RLF or other link recovery procedures.

A method for wireless communication at a base station is described. The method may include transmitting a first type of reference signal and a second type of reference signal associated with a cell, identifying, for a UE served by the base station, signal quality metrics associated with at least one of the first type of reference signal or the second type of reference signal, and configuring the UE to use the first type of reference signal, the second type of reference signal, or both for RLM based at least in part on the identified quality metrics.

An apparatus for wireless communication at a base station is described. The apparatus may include means for transmitting a first type of reference signal and a second type of reference signal associated with a cell, means for identifying, for a UE served by the base station, signal quality metrics associated with at least one of the first type of reference signal or the second type of reference signal, and means for configuring the UE to use the first type of reference signal, the second type of reference signal, or both for RLM based at least in part on the identified quality metrics.

Another apparatus for wireless communication at a base station is described. The apparatus may include a processor, memory in electronic communication with the processor, and instructions stored in the memory. The instructions may be operable to cause the processor to transmit a first type of reference signal and a second type of reference signal associated with a cell, identify, for a UE served by the base station, signal quality metrics associated with at least one of the first type of reference signal or the second type of reference signal, and configure the UE to use the first type of reference signal, the second type of reference signal, or both for RLM based at least in part on the identified quality metrics.

A non-transitory computer readable medium for wireless communication at a base station is described. The non-transitory computer-readable medium may include instructions operable to cause a processor to transmit a first type of reference signal and a second type of reference signal associated with a cell, identify, for a UE served by the base station, signal quality metrics associated with at least one of the first type of reference signal or the second type of reference signal, and configure the UE to use the first type of reference signal, the second type of reference signal, or both for RLM based at least in part on the identified quality metrics.

Some examples of the method, apparatus, and non-transitory computer-readable medium described above may further include processes, features, means, or instructions for determining that the signal quality metric for the first type of reference signal may be below a threshold. Some examples of the method, apparatus, and non-transitory computer-readable medium described above may further include processes, features, means, or instructions for configuring the UE to use the first type of reference signal and the second type of reference signal for the RLM based at least in part on determining that the signal quality metric for the first type of reference signal may be below the threshold.

Some examples of the method, apparatus, and non-transitory computer-readable medium described above may further include processes, features, means, or instructions for determining that the signal quality metric associated with the first type of reference signal may be above a threshold. Some examples of the method, apparatus, and non-transitory computer-readable medium described above may further include processes, features, means, or instructions for configuring the UE to use the first type of reference signal for the RLM based at least in part on determining that the signal quality metric for the first type of reference signal may be above the threshold.

Some examples of the method, apparatus, and non-transitory computer-readable medium described above may further include processes, features, means, or instructions for comparing a difference between the signal quality metric associated with the first type of reference signal and the signal quality metric associated with the second type of reference signal to a threshold. Some examples of the method, apparatus, and non-transitory computer-readable medium described above may further include processes, features, means, or instructions for configuring the UE to use the first type of reference signal, the second type of reference signal, or both for RLM based at least in part on a result of the comparing the difference to the threshold.

Some examples of the method, apparatus, and non-transitory computer-readable medium described above may further include processes, features, means, or instructions for determining, based on the first and second signal quality metrics, a first cell quality metric associated with the first type of reference signal and a second cell quality metric associated with the second type of reference signal, wherein the first and second cell quality metrics comprise layer 3 (L3) mobility metrics. Some examples of the method, apparatus, and non-transitory computer-readable medium described above may further include processes, features, means, or instructions for comparing a difference between the first cell quality metric associated with the first type of reference signal and the second cell quality metric associated with the second type of reference signal to a threshold. Some examples of the method, apparatus, and non-transitory computer-readable medium described above may further include processes, features, means, or instructions for configuring the UE to use the first type of reference signal, the second type of reference signal, or both for the RLM based at least in part on a result of the comparing the difference to the threshold.

Some examples of the method, apparatus, and non-transitory computer-readable medium described above may further include processes, features, means, or instructions for configuring the UE to report a signal quality of the first type of reference signal and a signal quality of the second type of reference signal, wherein the signal quality metric for the first type of reference signal may be identified based at least in part on receiving one or more reports of the signal quality of the first type of reference signal from the UE.

Some examples of the method, apparatus, and non-transitory computer-readable medium described above may further include processes, features, means, or instructions for configuring the UE to transmit a first type of sounding reference signal (SRS) derived from reception of the first type of reference signal. Some examples of the method, apparatus, and non-transitory computer-readable medium described above may further include processes, features, means, or instructions for receiving the first type of SRS from the UE. In some examples of the method, apparatus, and non-transitory computer-readable medium described above, a set of antenna ports used to receive the first type of SRS may be quasi co-located with a set of antenna ports used to transmit the first type of reference signal.

Some examples of the method, apparatus, and non-transitory computer-readable medium described above may further include processes, features, means, or instructions for measuring a signal quality of the first type of SRS. Some examples of the method, apparatus, and non-transitory computer-readable medium described above may further include processes, features, means, or instructions for determining that the measured signal quality of the first type of SRS may be below a signal quality threshold. Some examples of the method, apparatus, and non-transitory computer-readable medium described above may further include processes, features, means, or instructions for configuring the UE to use the second type of reference signal for RLM based at least in part on determining that the measured signal quality of the first type of SRS may be below the signal quality threshold.

Some examples of the method, apparatus, and non-transitory computer-readable medium described above may further include processes, features, means, or instructions for transmitting an indication of an antenna port configuration for the first type of reference signal and the second type of reference signal. Some examples of the method, apparatus, and non-transitory computer-readable medium described above may further include processes, features, means, or instructions for transmitting an indication of resources for the UE to monitor for the first type of reference signal and the second type of reference signal. Some examples of the method, apparatus, and non-transitory computer-readable medium described above may further include processes, features, means, or instructions for configuring the UE to use the second type of reference signal for the RLM when the UE may be operating in a discontinuous reception (DRX) mode.

In some examples of the method, apparatus, and non-transitory computer-readable medium described above, the first type of reference signal comprises a synchronization signal and the second type of reference signal comprises a channel state information reference signal. In some examples of the method, apparatus, and non-transitory computer-readable medium described above, the first type of reference signal comprises a demodulation reference signal for a broadcast channel and the second type of reference signal comprises a UE-specific reference signal. In some examples of the method, apparatus, and non-transitory computer-readable medium described above, the first type of reference signal comprises a non-beamformed channel state information reference signal and the second type of reference signal comprises a beamformed channel state information reference signal.

A method for wireless communication at a UE is described. The method may include receiving, from a base station serving the UE, a first type of reference signal and a second type of reference signal, receiving, from the base station, an RLM configuration comprising a first signal quality threshold and an indicator that the UE is to apply, in an RLM function, the first signal quality threshold to at least one of the first type of reference signal or the second type of reference signal, determining a first signal quality of the first type of reference signal and a second signal quality of the second type of reference signal, determining whether the UE is in-sync or out-of-sync for communication with the base station based at least in part on the RLM function and at least one of the first signal quality or the second signal quality, and communicating with the base station based at least in part on the determination of whether the UE is in-sync or out-of-sync. The RLM configuration may include an RLM function which may indicate what reference signal types and thresholds to use in RLM.

An apparatus for wireless communication at a UE is described. The apparatus may include means for receiving, from a base station serving the UE, a first type of reference signal and a second type of reference signal, means for receiving, from the base station, an RLM configuration comprising a first signal quality threshold and an indicator that the UE is to apply, in an RLM function, the first signal quality threshold to at least one of the first type of reference signal or the second type of reference signal, means for determining a first signal quality of the first type of reference signal and a second signal quality of the second type of reference signal, means for determining whether the UE is in-sync or out-of-sync for communication with the base station based at least in part on the RLM function and at least one of the first signal quality or the second signal quality, and means for communicating with the base station based at least in part on the determination of whether the UE is in-sync or out-of-sync. The RLM configuration may include an RLM function which may indicate what reference signal types and thresholds to use in RLM.

Another apparatus for wireless communication at a UE is described. The apparatus may include a processor, memory in electronic communication with the processor, and instructions stored in the memory. The instructions may be operable to cause the processor to receive, from a base station serving the UE, a first type of reference signal and a second type of reference signal, receive, from the base station, an RLM configuration comprising a first signal quality threshold and an indicator that the UE is to apply, in an RLM function, the first signal quality threshold to at least one of the first type of reference signal or the second type of reference signal, determine a first signal quality of the first type of reference signal and a second signal quality of the second type of reference signal, determine whether the UE is in-sync or out-of-sync for communication with the base station based at least in part on the RLM function and at least one of the first signal quality or the second signal quality, and communicate with the base station based at least in part on the determination of whether the UE is in-sync or out-of-sync. The RLM configuration may include an RLM function which may indicate what reference signal types and thresholds to use in RLM.

A non-transitory computer readable medium for wireless communication at a UE is described. The non-transitory computer-readable medium may include instructions operable to cause a processor to receive, from a base station serving the UE, a first type of reference signal and a second type of reference signal, receive, from the base station, an RLM configuration comprising a first signal quality threshold and an indicator that the UE is to apply, in an RLM function, the first signal quality threshold to at least one of the first type of reference signal or the second type of reference signal, determine a first signal quality of the first type of reference signal and a second signal quality of the second type of reference signal, determine whether the UE is in-sync or out-of-sync for communication with the base station based at least in part on the RLM function and at least one of the first signal quality or the second signal quality, and communicate with the base station based at least in part on the determination of whether the UE is in-sync or out-of-sync. The RLM configuration may include an RLM function which may indicate what reference signal types and thresholds to use in RLM.

Some examples of the method, apparatus, and non-transitory computer-readable medium described above may further include processes, features, means, or instructions for determining a maximum signal quality of the first signal quality and the second signal quality. Some examples of the method, apparatus, and non-transitory computer-readable medium described above may further include processes, features, means, or instructions for determining whether the UE may be in-sync or out-of-sync based at least in part on comparing the maximum signal quality to the first signal quality threshold.

Some examples of the method, apparatus, and non-transitory computer-readable medium described above may further include processes, features, means, or instructions for determining a minimum block error rate based on the first signal quality and the second signal quality. Some examples of the method, apparatus, and non-transitory computer-readable medium described above may further include processes, features, means, or instructions for determining whether the UE may be in-sync or out-of-sync based at least in part on comparing the minimum block error rate to a configured block error rate threshold.

Some examples of the method, apparatus, and non-transitory computer-readable medium described above may further include processes, features, means, or instructions for combining the first signal quality and the second signal quality. Some examples of the method, apparatus, and non-transitory computer-readable medium described above may further include processes, features, means, or instructions for determining whether the UE may be in-sync or out-of-sync based at least in part on comparing the combined signal quality to the first signal quality threshold.

Some examples of the method, apparatus, and non-transitory computer-readable medium described above may further include processes, features, means, or instructions for determining that a periodicity of the first type of reference signal may be greater than a periodicity threshold. Some examples of the method, apparatus, and non-transitory computer-readable medium described above may further include processes, features, means, or instructions for determining whether the UE may be in-sync or out-of-sync based at least in part on the second signal quality.

Some examples of the method, apparatus, and non-transitory computer-readable medium described above may further include processes, features, means, or instructions for determining that a periodicity of the second type of reference signal may be greater than a periodicity threshold. Some examples of the method, apparatus, and non-transitory computer-readable medium described above may further include processes, features, means, or instructions for determining whether the UE may be in-sync or out-of-sync based at least in part on the first signal quality.

In some examples of the method, apparatus, and non-transitory computer-readable medium described above, the RLM configuration comprises a second signal quality threshold, and determining whether the UE may be in-sync or out-of-sync comprises determining that the UE may be out-of-sync based at least in part on determining that the first signal quality may be below the first signal quality threshold, or determining that the UE may be out-of-sync based at least in part on determining that the first signal quality may be below the first signal quality threshold and the second signal quality may be below the second signal quality threshold.

In some examples of the method, apparatus, and non-transitory computer-readable medium described above, the RLM configuration comprises a second signal quality threshold, and determining whether the UE may be in-sync or out-of-sync comprises determining that the UE may be in-sync based at least in part on determining that the first signal quality may be above the first signal quality threshold, or determining that the UE may be in-sync based at least in part on determining that the first signal quality may be above the first signal quality threshold, or the second signal quality may be above the second signal quality threshold, or both.

In some examples of the method, apparatus, and non-transitory computer-readable medium described above, the first type of reference signal comprises a synchronization signal and the second type of reference signal comprises a channel state information reference signal. In some examples of the method, apparatus, and non-transitory computer-readable medium described above, the first type of reference signal comprises a demodulation reference signal for a broadcast channel and the second type of reference signal comprises a UE-specific reference signal. In some examples of the method, apparatus, and non-transitory computer-readable medium described above, the first type of reference signal comprises a non-beamformed channel state information reference signal and the second type of reference signal comprises a beamformed channel state information reference signal.

DETAILED DESCRIPTION

Figure 1:
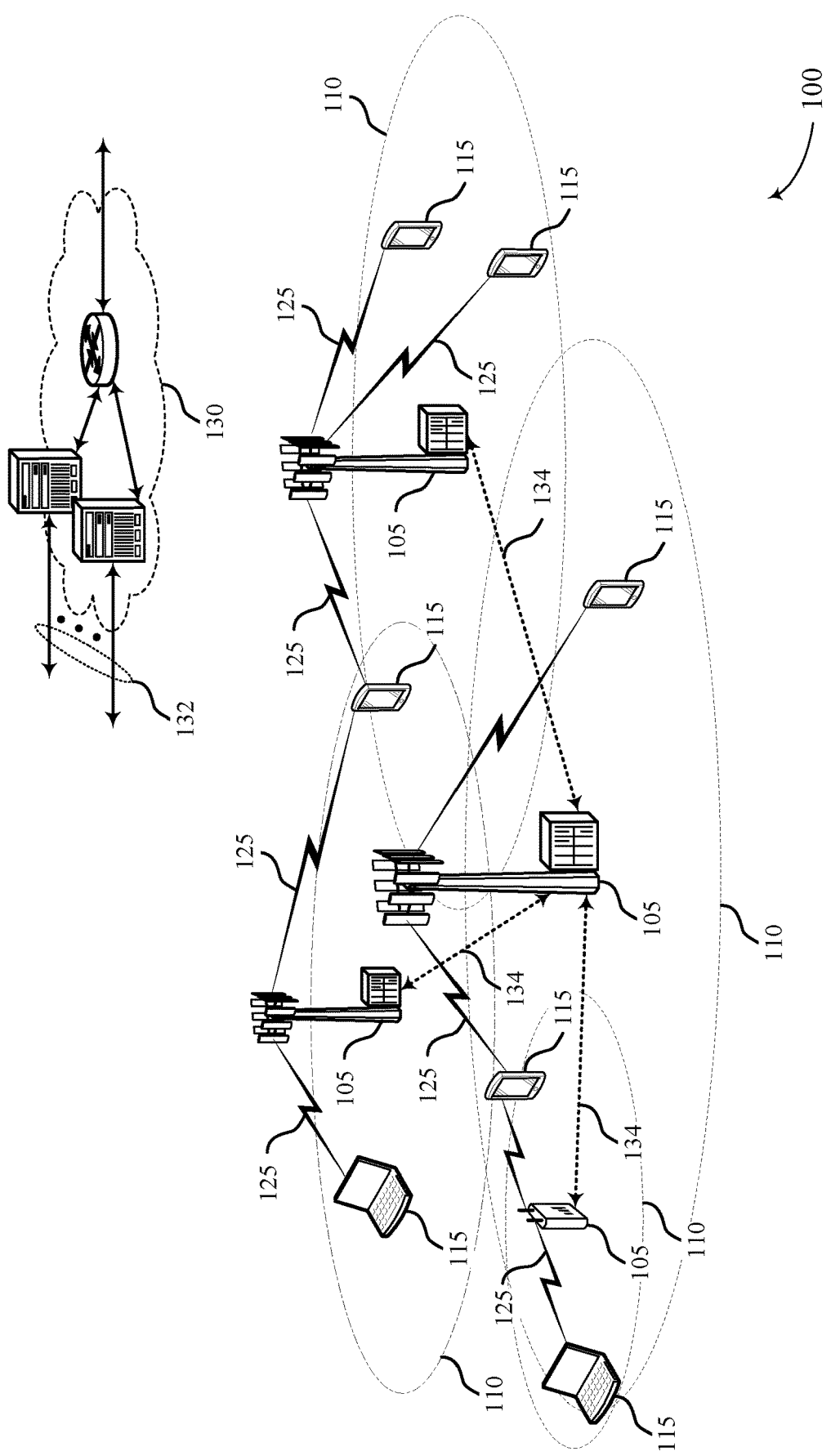
FIGS. 1 and 2 illustrate examples of wireless communications systems that supports radio link monitoring (RLM) based on multiple reference signals in accordance with various aspects of the present disclosure.

In some wireless communications systems, user equipment (UEs) may support techniques for monitoring the quality of a radio link used for communication with a cell. If a UE detects that there is a radio link failure (RLF), the UE may take appropriate action to recover the connection with the cell or begin searching for a different cell with a suitable radio link. Additionally or alternatively, the UE may detect the loss of reception of a configured beam for the UE, in which case the UE may perform a beam recovery process to re-establish a beam for communication. In some cases, the radio link quality may be associated with the reliability of a downlink control channel (e.g., a physical downlink control channel (PDCCH) in LTE systems and an NR-PDCCH in NR systems (or 5G systems)). That is, the UE 115 may monitor the reliability of a PDCCH received from the cell to determine the quality of a radio link with the cell. In other cases, the radio link quality may be associated with the quality of reference signals of a particular type received from the cell. That is, the UE 115 may monitor the quality of reference signals received from the cell to determine the quality of a radio link with the cell.

In some wireless communications systems (e.g., Fifth Generation (5G) systems), however, it may be difficult for the UE to monitor the quality of a radio link by monitoring the reliability of a PDCCH or the quality of reference signals of a particular type. Specifically, the system may not support continuous transmission of reference signals such as common reference signals (CRS), and the system may have discontinuous transmission windows. Thus, a UE may not be able to consistently monitor the quality of a radio link by monitoring the quality of a continuously transmitted reference signal. Similarly, downlink transmissions on the PDCCH may be sporadic, and the UE may not be able to consistently monitor the quality of a radio link by monitoring the reliability of the PDCCH. In addition, the UE may not know whether or not a cell may be transmitting on a PDCCH, and, as a result, the UE may not be able to receive signals on the PDCCH to determine the quality of a radio link.

In such cases, the UE may request PDCCH transmissions or reference signal transmissions from a cell for the purpose of performing RLM. However, these transmissions may cause unnecessary overhead in a wireless communications system. As described herein, a UE may support efficient techniques for performing RLM without requesting additional transmissions from a cell. In one aspect, a UE may be configured to perform measurements of the quality of a radio link based on multiple reference signals (e.g., synchronization signals or channel state information reference signals (CSI-RSs)) of different types. Since at least one of the different types of reference signals may be transmitted relatively frequently, the UE may have access to sufficient reference signals to be able to consistently monitor the quality of a radio link with a cell.

Aspects of the disclosure introduced above are described below in the context of a wireless communications system. Examples of processes and signaling exchanges that support RLM based on multiple reference signals are then described. Aspects of the disclosure are further illustrated by and described with reference to apparatus diagrams, system diagrams, and flowcharts that relate to RLM based on multiple reference signals.

FIG. 1 illustrates an example of a wireless communications system 100 that supports RLM based on multiple reference signals in accordance with various aspects of the present disclosure. In some examples, the wireless communications system 100 may be a Long Term Evolution (LTE) network, an LTE-Advanced (LTE-A) network, or a 5G network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or 5G network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, the antennas of a base station 105 or UE 115 may be located within one or more antenna arrays, which may support transmit or receive beamforming. Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115).

In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a millimeter wave (mmW) receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise (SNR) ratio, or otherwise acceptable signal quality based at least in part on listening according to multiple beam directions).

In wireless communications system 100, UEs 115 may support techniques for monitoring the quality of a radio link or a beam used for communication with a cell. If a UE 115 detects that there is a radio link failure (RLF), the UE 115 may take appropriate action to recover the connection with a cell (e.g., beam recovery) or begin searching for a different cell with a suitable radio link. In some cases, the radio link quality may be associated with the reliability of a downlink control channel (e.g., a physical downlink control channel (PDCCH) in LTE systems and an NR-PDCCH in NR systems (or 5G systems)). That is, the UE 115 may monitor the reliability of a PDCCH received from a cell to determine the quality of a radio link with the cell. In other cases, the radio link quality may be associated with the quality of reference signals of a particular type received from a cell. That is, the UE 115 may monitor the quality of reference signals received from a cell to determine the quality of a radio link with the cell.

In some wireless communications systems (e.g., 5G systems), however, it may be difficult for the UE to monitor the quality of a radio link or a beam because the presence of PDCCH transmissions may be unknown and there may be no continuously transmitted common reference signals. Specifically, transmissions of reference signals of a particular type may be sporadic, and a UE 115 may not be able to consistently monitor the quality of a radio link by monitoring the quality of reference signals of the particular type. Similarly, downlink transmissions on the PDCCH may be sporadic, and the UE 115 may not be able to consistently monitor the quality of a radio link by monitoring the reliability of the PDCCH. In addition, the UE 115 may not know whether or not a cell may be transmitting on a PDCCH, and, as a result, the UE 115 may not be able to receive signals on the PDCCH to determine the quality of a radio link.

In such cases, the UE 115 may request PDCCH transmissions or reference signal transmissions from a cell for the purpose of performing RLM. However, if the transmission of requests for PDCCH transmissions or reference signal transmissions may cause unnecessary overhead in a wireless communications system. As described herein, UEs 115 in wireless communications system 100 may support efficient techniques for performing RLM without requesting additional transmissions from a cell, thus minimizing overhead in wireless communications system 100. In one aspect, a UE 115 may be configured to perform measurements of the quality of a radio link or beam based on multiple reference signals of different types (e.g., synchronization signals or channel state information reference signals (CSI-RSs). Since such different types of reference signals may be transmitted relatively frequently, the UE 115 may be able to consistently monitor the quality of a radio link or a configured beam for a cell.

Figure 2:
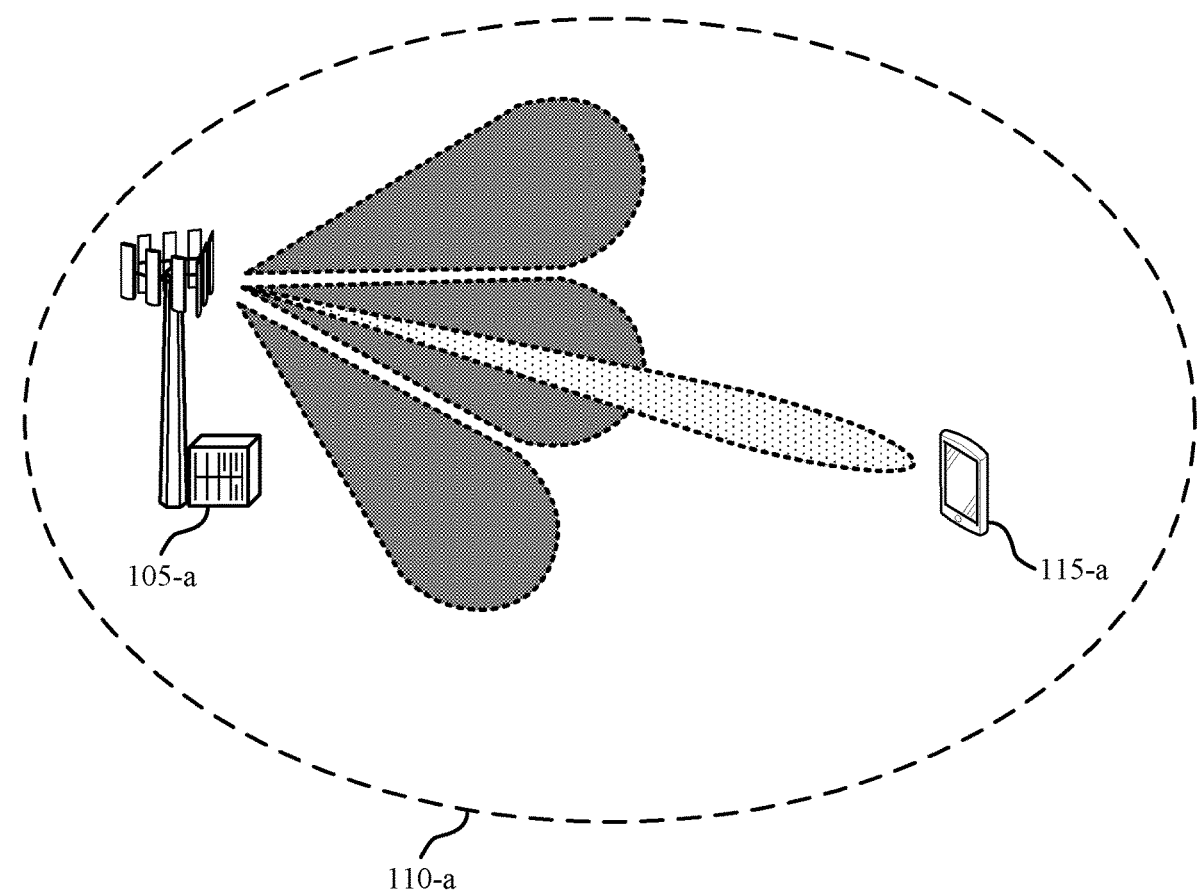

FIG. 2 illustrates an example of a wireless communications system 200 that supports RLM based on multiple reference signals in accordance with various aspects of the present disclosure. Wireless communications system 200 includes base station 105-*a*, which may be an example of a base station 105 described with reference to FIG. 1. Wireless communications system 200 also includes UE 115-*a*, which may be an example of a UE 115 described with reference to FIG. 1. Base station 105-*a* may provide communication coverage for UEs 115 (including UE 115-*a*) within coverage area 110-*a*.

In some cases, base station 105-*a* may transmit (or broadcast) a first type of reference signal 205 and a second type of reference signal 210 to one or more UEs 115 within coverage area 110-*a*. In the example of FIG. 2, the first type of reference signal may be a synchronization signal (e.g., NR synchronization signal (NR-SS)) and the second type of reference signal may be a CSI-RS. In other examples, the first type of reference signal may be a demodulation reference signal and the second type of reference signal may be a UE-specific reference signal. In yet other examples, the first type of reference signal may be a non-beamformed reference signal (e.g., non-beamformed CSI-RS) and the second type of reference signal may be a beamformed reference signal (e.g., beamformed CSI-RS). Base station 105-*a* may transmit the first type of reference signal and/or the second type of reference signal periodically, aperiodically, or semi-persistently. For example, NR-SS may be transmitted according to a synchronization periodicity, which may be every 5, 10, 20, 40, or 80 ms, while CSI-RS may be transmitted in discovery reference signal (DRS) transmissions at a different periodicity. In some cases CSI-RS may also be present in control or data transmissions to UEs.

Base station 105-a may transmit an indication of a number of antenna ports for UE 115-a to use to receive these reference signals. In addition, base station 105-a may transmit an indication of resources (e.g., time and frequency resources) for UE 115-a to monitor for these types of reference signals. Once UE 115-a receives the first and second types of reference signals, UE 115-a may perform RLM based on the first type of reference signal 205, the second type of reference signal 210, or both. In some cases, base station 105-a may configure UE 115-a to use specific types of reference signals for RLM based on the quality of the different types of reference signals received by UE 115-a. That is, base station 105-a may configure UE 115-a to use specific types of reference signals for RLM based on signal quality metrics associated with the different types of reference signals received by UE 115-a.

In one example, base station 105-a may identify the signal quality metrics for specific reference signals received by UE 115-a based on signal quality reports received from UE 115-a. Base station 105-a may configure UE 115-a to report signal quality (e.g., reference signal received power (RSRP), reference signal received quality (RSRQ), SNR, etc.) for the first type of reference signal and/or the second type of reference signal. In some cases, the configuration to report signal quality to base station 105-a may be a configuration of lower layers (e.g., layer 1 (L1) or layer 2 (L2)) responsible for beam management at the UE 115-a. In other cases, the configuration to report signal quality to base station 105-a may be a configuration of upper layers (e.g., layer 3 (L3)) responsible for mobility at the UE 115-a. Base station 105-a may configure UE 115-a to report the signal quality of these reference signals periodically, aperiodically, semi-persistently, or based on an event-based trigger. Once base station 105-a receives the signal quality reports from UE 115-a, base station 105-a may modify the configuration for UE 115-a for RLM reporting.

In some aspects, base station 105-a may configure UE 115-a to use specific reference signals for RLM based on comparing the signal quality metrics of one or more types of reference signals to one or more thresholds. For example, if base station 105-a determines that a signal quality metric for the first type of reference signal 205 (e.g., determined based on the signal quality reports) is below a threshold, base station 105-a may configure UE 115-a to use the first type of reference signal 205 and the second type of reference signal 210 for RLM. Alternatively, if base station 105-a determines that a signal quality metric for the first type of reference signal 205 is above a threshold, base station 105-a may configure UE 115-a to use the first type of reference signal 205 for RLM.

In other aspects, base station 105-a may configure UE 115-a to use specific reference signals for RLM based on comparing the signal quality metrics of different types of reference signals. For example, base station 105-a may configure UE 115-a to use the first type of reference signal 205, the second type of reference signal 210, or both for RLM based on determining whether the signal quality of the first type of reference signal 205 is substantially lower than the signal quality of the second type of reference signal 210.

In some cases, base station 105-a may identify a difference between the signal quality metric associated with the first type of reference signal 205 and the signal quality metric associated with the second type of reference signal 210, and base station 105-a may compare the difference to a threshold.

If base station 105-a determines that the difference between the signal quality metrics of the first type of reference signal 205 and the second type of reference signal 210 is above a threshold, base station 105-a may configure UE 115-a to use the first type of reference signal 205 and the second type of reference signal 210 for RLM. Alternatively, if base station 105-a determines that the difference between the signal quality metrics of the first type of reference signal 205 and the second type of reference signal 210 is below a threshold, base station 105-a may configure UE 115-a to use the first type of reference signal 205 for RLM only.

In yet other aspects, base station 105-a may configure UE 115-a to use specific reference signals for RLM based on comparing the cell quality metrics (e.g., layer 3 (L3) metrics) of different types of reference signals. For example, base station 105-a may configure UE 115-a to use the first type of reference signal 205, the second type of reference signal 210, or both for RLM based on determining whether the cell quality of the first type of reference signal 205 is substantially lower than the cell quality of the second type of reference signal 210. In some cases, base station 105-a may identify a difference between the cell quality metric associated with the first type of reference signal and the cell quality metric associated with the second type of reference signal, and base station 105-a may compare the difference to a threshold.

If base station 105-a determines that the difference between the cell quality metrics of the first type of reference signal 205 and the second type of reference signal 210 is above a threshold, base station 105-a may configure UE 115-a to use the first type of reference signal 205 and the second type of reference signal 210 for RLM. Alternatively, if base station 105-a determines that the difference between the cell quality metrics of the first type of reference signal 205 and the second type of reference signal 210 is below a threshold, base station 105-a may configure UE 115-a to use the first type of reference signal 205 for RLM.

Additionally or alternatively to determining signal quality metrics based on reports received from UE 115-a, base station 105-a may identify signal quality metrics of the reference signals received by UE 115-a based on the quality of reference signals (e.g., sounding reference signals (SRSs)) received from UE 115-a. As an example, base station 105-a may configure UE 115-a to transmit SRSs using an antenna port configuration derived from the antenna port configuration used by UE 115-a to receive the first type of reference signal 205. Further, the antenna ports used to receive the SRSs from UE 115-a may be quasi co-located with the antenna ports used to transmit the first type of reference signal 205.

Since the base station 105-a may use similar antenna port configurations to transmit the first type of reference signal 205 and receive the SRSs, and the UE 115-a may use similar antenna port configurations to receive the first type of reference signal 205 and transmit the SRSs, the quality of the SRSs received by base station 105-a may correspond to the quality of the first type of reference signal 205 received by UE 115-a (e.g., via channel reciprocity). Accordingly, when base station 105-a receives the SRSs from UE 115-a, base station 105-a may measure the signal quality of the SRS to determine the quality of the first type of reference signal 205 received by the UE 115-*a*.

In some aspects, base station 105-*a* may then configure UE 115-*a* to use specific reference signals for RLM based on comparing the measured signal quality of the SRSs to a signal quality threshold. If UE 115-*a* determines that the measured signal quality of the SRSs is below a signal quality threshold, base station 105-*a* may configure UE 115-*a* to use the first type of reference signal 205 and the second type of reference signal 210 for RLM. In such cases, the antenna ports used to transmit the second type of reference signal 210 may be quasi co-located with the antenna ports used to transmit on a PDCCH. Alternatively, if UE 115-*a* determines that the measured signal quality of the SRSs is above a signal quality threshold, base station 105-*a* may configure UE 115-*a* to use the first type of reference signal 205 for RLM. As discussed herein, various parameters such as the signal quality threshold may be different for different network configurations and may be set by network operators according to the specific circumstances of the system. For example, the signal quality threshold may be based on varying parameters, which in turn, may depend on at least the different configurations of various mobile devices and networks.

Based on one or more of the scenarios described above, base station 105-*a* may select and transmit an RLM configuration to UE 115-*a*. UE 115-*a* may then receive the RLM configuration and determine which reference signals to use to perform RLM based on the configuration. In the example of FIG. 2, UE 115-*a* may determine a first signal quality of the first type of reference signal 205 and a second signal quality of the second type of reference signal 210, and UE 115-*a* may perform RLM based on determining the signal qualities of these signals. Specifically, UE 115-*a* may determine whether it is in-sync or out-of-sync for communication with base station 105-*a* based on the RLM configuration received from base station 105-*a* and/or the first signal quality, the second signal quality, or both.

The RLM configuration may include an RLM function, which may indicate what reference signal types and thresholds to use in RLM. Further, the RLM configuration may additionally include an indicator that the UE is to apply, in an RLM function, the first signal quality threshold to at least one of the first type of reference signal or the second type of reference signal. In a first RLM function, UE 115-*a* may determine a maximum signal quality of the first signal quality and the second signal quality, and UE 115-*a* may determine whether the UE is in-sync or out-of-sync based on comparing the maximum signal quality (e.g., over a specified duration) to a signal quality threshold (e.g., which may be a preconfigured threshold or may be configured by base station 105-*a*). If the maximum signal quality is above the signal quality threshold, UE 115-*a* may determine that it is in-sync with base station 105-*a*. Alternatively, if the maximum signal quality is below the signal quality threshold, UE 115-*a* may determine that it is out-of-sync with base station 105-*a*. In some cases, the maximum signal quality may correspond to a block error rate (BLER), and UE 115-*a* may determine that it is in-sync with base station 105-*a* if the BLER is sufficiently low.

In a second RLM function, UE 115-*a* may determine a minimum BLER based on the first signal quality and the second signal quality, and UE 115-*a* may determine whether it is in-sync or out-of-sync based on comparing the minimum BLER (e.g., over a specified duration) to a BLER threshold (e.g., configured by base station 105-*a*). If the minimum BLER is below the BLER threshold, UE 115-*a* may determine that it is in-sync with base station 105-*a*. Alternatively, if the minimum BLER is above the BLER threshold, UE 115-*a* may determine that it is out of sync with base station 105-*a*. In a third RLM function, UE 115-*a* may combine the first signal quality and the second signal quality, and UE 115-*a* may determine whether it is in-sync or out-of-sync based on comparing the combined signal quality to a signal quality threshold. If the combined signal quality is above the signal quality threshold, UE 115-*a* may determine that it is in-sync with base station 105-*a*. Alternatively, if the combined signal quality is below the signal quality threshold, UE 115-*a* may determine that it is out-of-sync with base station 105-*a*.

In a fourth RLM function, instead of comparing a maximum, minimum, or combination of the first and second signal qualities to a single threshold, UE 115-*a* may compare each of the first and second signal qualities to different thresholds to determine whether it is in-sync or out-of-sync. In one example, UE 115-*a* may determine that it is out-of-sync based on determining that the first signal quality is below a first signal quality threshold. Alternatively, UE 115-*a* may determine that it is out-of-sync based on determining that the first signal quality is below a first signal quality threshold and the second signal quality is below a second signal quality threshold. In another example, UE 115-*a* may determine that it is in-sync based on determining that the first signal quality is above a third signal quality threshold (e.g., which maybe the same or different than the first signal quality threshold). Alternatively, UE 115-*a* may determine that it is in-sync based on determining that the first signal quality is above the third signal quality threshold, or the second signal quality is above a fourth signal quality threshold (e.g., which may be the same or different than the second signal quality threshold), or both.

Figure 3:
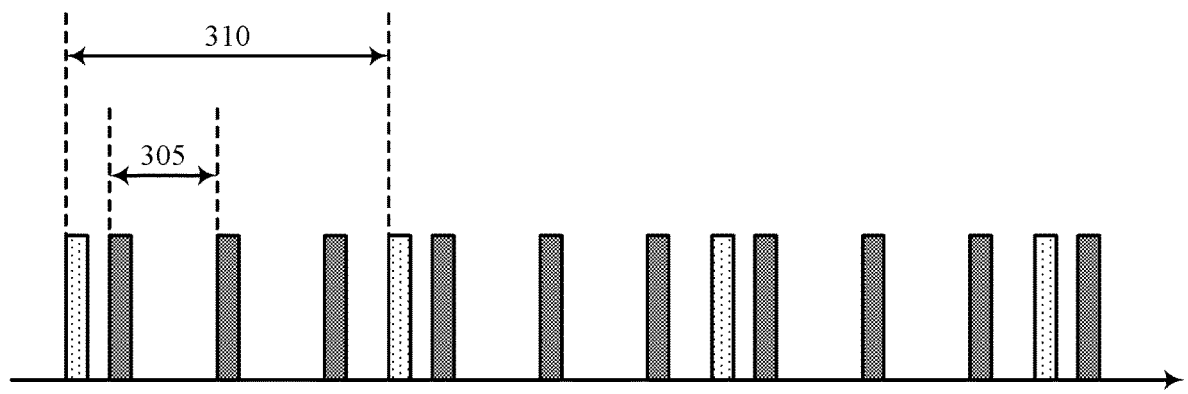
FIG. 3 illustrates an example of a timing diagram showing transmissions of reference signals in accordance with various aspects of the present disclosure.

FIG. 3 illustrates an example of a timing diagram 300 showing transmissions of reference signals in accordance with various aspects of the present disclosure. As described with reference to FIG. 2, base station 105-*a* may transmit a first type of reference signal 205 and a second type of reference signal 210 to one or more UEs (including UE 115-*a*). In the present example, the first type of reference signal 205 may be transmitted with a first periodicity 305 and the second type of reference signal 210 may be transmitted with a second periodicity 310.

In some cases, in addition (or as an alternative) to being configured by base station 105-*a* to use certain types of reference signals for RLM, UE 115-*a* may be configured to determine to use certain types of reference signals for RLM based on the periodicities of these reference signals. In one example, UE 115-*a* may determine that the first periodicity 305 of the first type of reference signal 205 is greater than a periodicity threshold, and, in this case, UE 115-*a* may use the second type of reference signal 210 for RLM. In another example, UE 115-*a* may determine that the second periodicity 310 of the second type of reference signal 210 is greater than a periodicity threshold, and, in this case, UE 115-*a* may use the first type of reference signal 205 for RLM.

Figure 4:
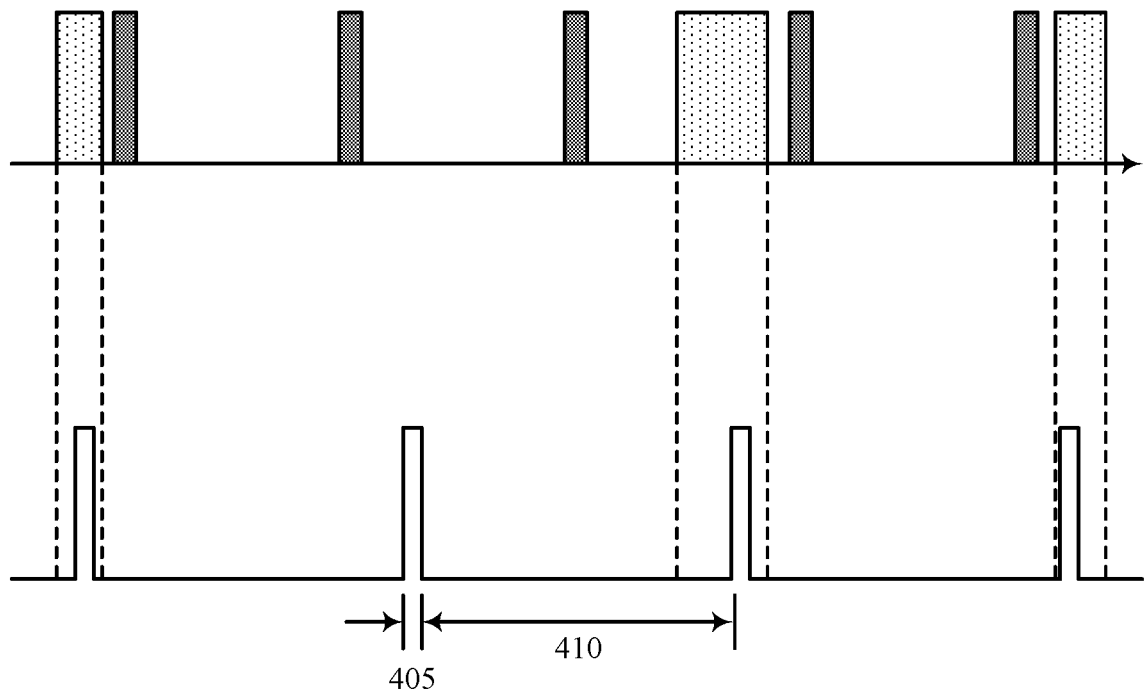
FIG. 4 illustrates an example of a DRX cycle in accordance with various aspects of the present disclosure.

UE 115-*a* may also be configured to use certain types of reference signals for RLM when the UE 115-*a* is operating in a connected mode discontinuous reception (C-DRX) mode. FIG. 4 illustrates an example of a C-DRX cycle 400 in accordance with various aspects of the present disclosure. UE 115-*a* may be in an active state during ON-duration 405 and in an inactive state during OFF-duration 410. In this example, UE 115-*a* may perform RLM when the UE 115-*a* is in the active state, and UE 115-*a* may refrain from performing RLM when the UE 115-*a* is in an inactive state (e.g., to conserve power). In order to ensure that UE 115-*a* does not have to transition out of an inactive state to perform RLM during the OFF-durations 410, base station 105-*a* may configure UE 115-*a* to use certain reference signals for RLM.

In the example of FIG. 3, base station 105-*a* may configure UE 115-*a* to perform RLM based on the second type of reference signal 210. For example, the first type of reference signal may be NR-SS, which may be transmitted periodically, and may not overlap with the ON-durations 405. The second type of reference signal may be CSI-RS, which may be transmitted in downlink transmissions to the UE during the C-DRX-on durations, as well as in downlink transmissions to other UEs during the C-DRX-on durations. Since the ON-durations 405 in the DRX cycle overlaps with some reference signals of the second type, UE 115-*a* may not have to transition out of the inactive state to perform RLM. In other examples, UE 115-*a* may be configured to monitor both the first type of reference signal 205 and the second type of reference signal 210 for RLM. However, when the UE 115-*a* is operating in the C-DRX mode, UE 115-*a* may determine to use only the second type of reference signal 210 for RLM to avoid having to transition out of the inactive state to perform RLM.

Figure 5:
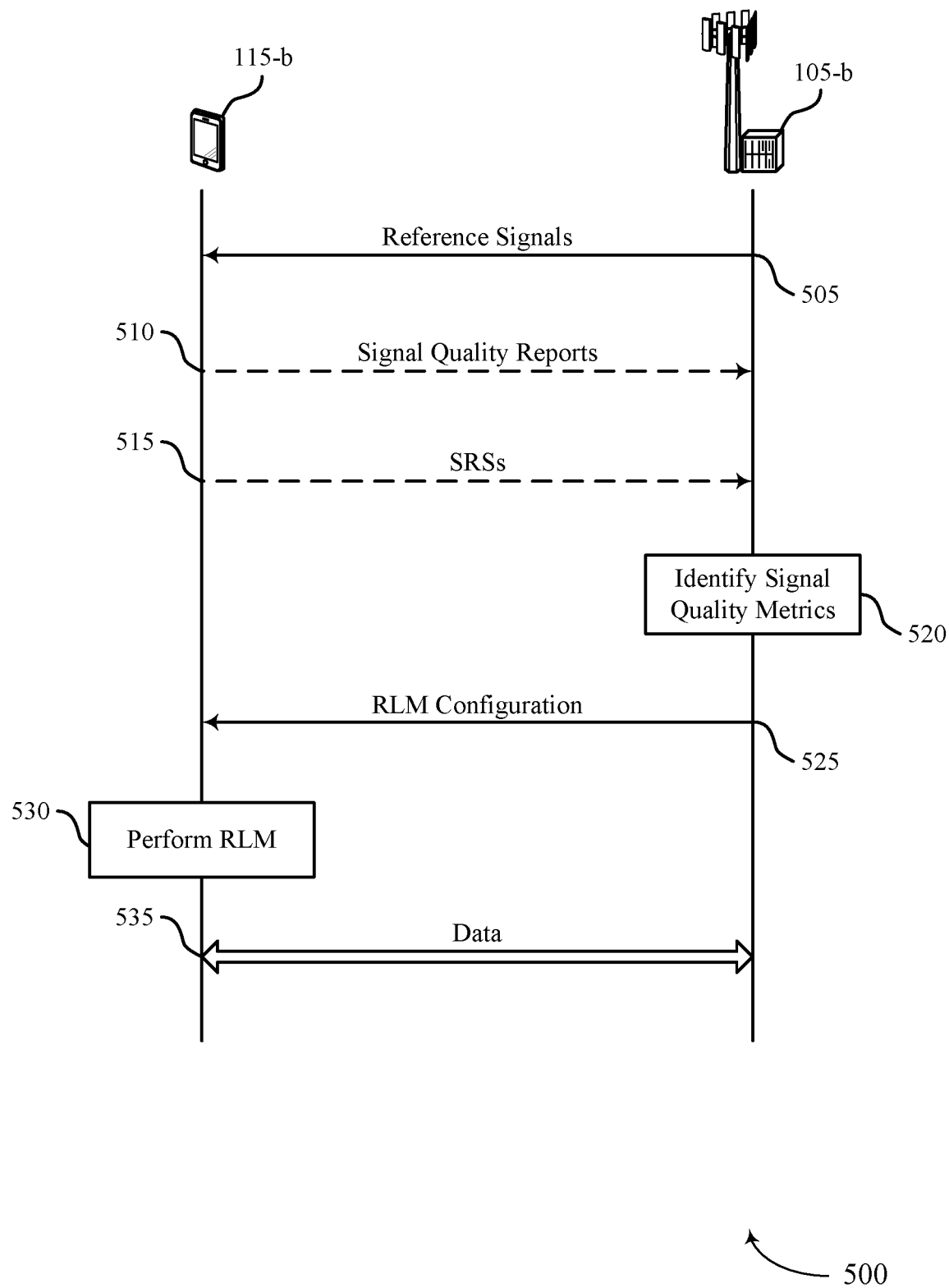
FIG. 5 illustrates an example of a process flow in a system that supports RLM based on multiple reference signals in accordance with various aspects of the present disclosure.

FIG. 5 illustrates an example of a process flow 500 in a system that supports RLM based on multiple reference signals in accordance with various aspects of the present disclosure. Process flow 500 illustrates aspects of techniques performed by base station 105-*a*, which may be an example of a base station 105 described with reference to FIGS. 1-4. Process flow 500 also illustrates aspects of techniques performed by a UE 115-*a*, which may be an example of a UE 115 described with reference to FIGS. 1-4.

At 505, base station 105-*b* may transmit a first type of reference signal and a second type of reference signal (e.g., associated with a cell) to UE 115-*b*. In some cases, the first type of reference signal is a synchronization signal and the second type of reference signal is a CSI-RS. In other cases, the first type of reference signal is a demodulation reference signal (e.g., DMRS in PBCH) and the second type of reference signal is a UE-specific reference signal. In yet other cases, the first type of reference signal is a non-beamformed CSI-RS and the second type of reference signal is a beamformed CSI-RS. Base station 105-*b* may transmit an indication of an antenna port configuration for the first type of reference signal and the second type of reference signal. Further, base station 105-*b* may also transmit an indication of resources for UE 115-*b* to monitor for the first type of reference signal and the second type of reference signal.

In some aspects, base station 105-*b* may configure UE 115-*b* to report a signal quality of the first type of reference signal and/or a signal quality of the second type of reference signal. In such aspects, at 510, UE 115-*b* may transmit signal quality reports to base station 105-*b*. At 520, based on these reports, base station 105-*b* may identify, for UE 115-*b*, signal quality metrics associated with at least one of the first type of reference signal or the second type of reference signal. In some examples, base station 105-*b* may determine that the signal quality metric for the first type of reference signal is below a threshold, and base station 105-*b* may configure UE 115-*b* to use the first type of reference signal and the second type of reference signal for RLM based on this determination. In other examples, base station 105-*b* may determine that the signal quality metric associated with the first type of reference signal is above a threshold, and base station 105-*b* may configure UE 115-*b* to use the first type of reference signal for RLM based on this determination.

In some instances, base station 105-*b* may configure UE 115-*b* to use certain reference signals for RLM based on a comparison of the signal quality metrics of the first type of reference signal and the second type of reference signals. For example, base station 105-*b* may compare a difference between the signal quality metric associated with the first type of reference signal and the signal quality metric associated with the second type of reference signal to a threshold, and configure UE 115-*b* to use the first type of reference signal, the second type of reference signal, or both for RLM based on the result of comparing the difference to the threshold. In other instances, base station 105-*b* may configure UE 115-*b* to use certain reference signals for RLM based on a comparison of cell quality metrics of the first type of reference signal and the second type of reference signal. For example, base station 105-*b* may determine, based on the first and second signal quality metrics, a first cell quality metric associated with the first type of reference signal and a second cell quality metric associated with the second type of reference signal, where the first and second cell quality metrics are L3 mobility metrics. Base station 105-*b* may then compare a difference between the first cell quality metric associated with the first type of reference signal and the second cell quality metric associated with the second type of reference signal to a threshold, and base station 105-*b* may configure UE 115-*b* to use the first type of reference signal, the second type of reference signal, or both for RLM based on a result of comparing the difference to the threshold.

In other aspects, base station 105-*b* may configure UE 115-*b* to transmit SRSs derived from reception of the first type of reference signal, and, at 515, base station 105-*b* may receive SRSs from UE 115-*b*. In such aspects, at 520, base station may identify, for UE 115-*b*, signal quality metrics associated with at least one of the first type of reference signal or the second type of reference signal based on the SRSs received from UE 115-*b*. In some cases, base station 105-*b* may measure a signal quality of the SRSs to determine whether to configure UE 115-*b* to use the second type of reference signal for RLM. As an example, base station 105-*b* may determine that the measured signal quality of the SRSs is below a signal quality threshold, and base station 105-*b* may configure UE 115-*b* to use the second type of reference signal for RLM based on this determination. In some examples, the set of antenna ports used to receive the first type of SRS may be quasi co-located with the set of antenna ports used to transmit the first type of reference signal. Further, in addition to the above examples, base station 105-*b* may, in some cases, configure UE 115-*b* to use the second type of reference signal for RLM when UE 115-*b* is operating in a DRX mode.

At 525, once base station 105-*b* identifies the appropriate RLM configuration for UE 115-*b* (e.g., based on the scenarios described above), base station 105-*b* may transmit the RLM configuration to UE 115-*b*. In some examples, the RLM configuration may include a first signal quality threshold and an indicator that the UE is to apply, in an RLM function, the first signal quality threshold to at least one of the first type of reference signal or the second type of reference signal. The RLM configuration may include an RLM function which may indicate what reference signal types and thresholds to use in RLM. UE 115-*b* may receive the RLM configuration and, at 530, may perform RLM based on the RLM configuration. Specifically, UE 115-*b* may determine a first signal quality of the first type of reference signal and a second signal quality of the second type of reference signal, and UE 115-*b* may determine whether UE 115-*b* is in-sync or out-of-sync for communication with base station 105-*b* based on the RLM function and at least one of the first signal quality or the second signal quality.

In some examples, UE 115-*b* may also determine which signal quality to use to determine whether UE 115-*b* is in-sync or out-of-sync based on the periodicities of the first type of reference signal and the second type of reference signal. In one example, UE 115-*b* may determine that a periodicity of the first type of reference signal is greater than a periodicity threshold, and, in this example, UE 115-*b* may determine whether the UE is in-sync or out-of-sync based on the second signal quality. In another example, UE 115-*b* may determine that a periodicity of the second type of reference signal is greater than a periodicity threshold, and, in this example, UE 115-*b* may determine whether the UE is in-sync or out-of-sync based on the first signal quality. At 535, after UE 115-*b* determines whether it is in-sync or out-of-sync for communication with base station 105-*b*, UE 115-*b* may communicate with base station 105-*b* based on the determination of whether the UE is in-sync or out-of-sync.

Figure 6:
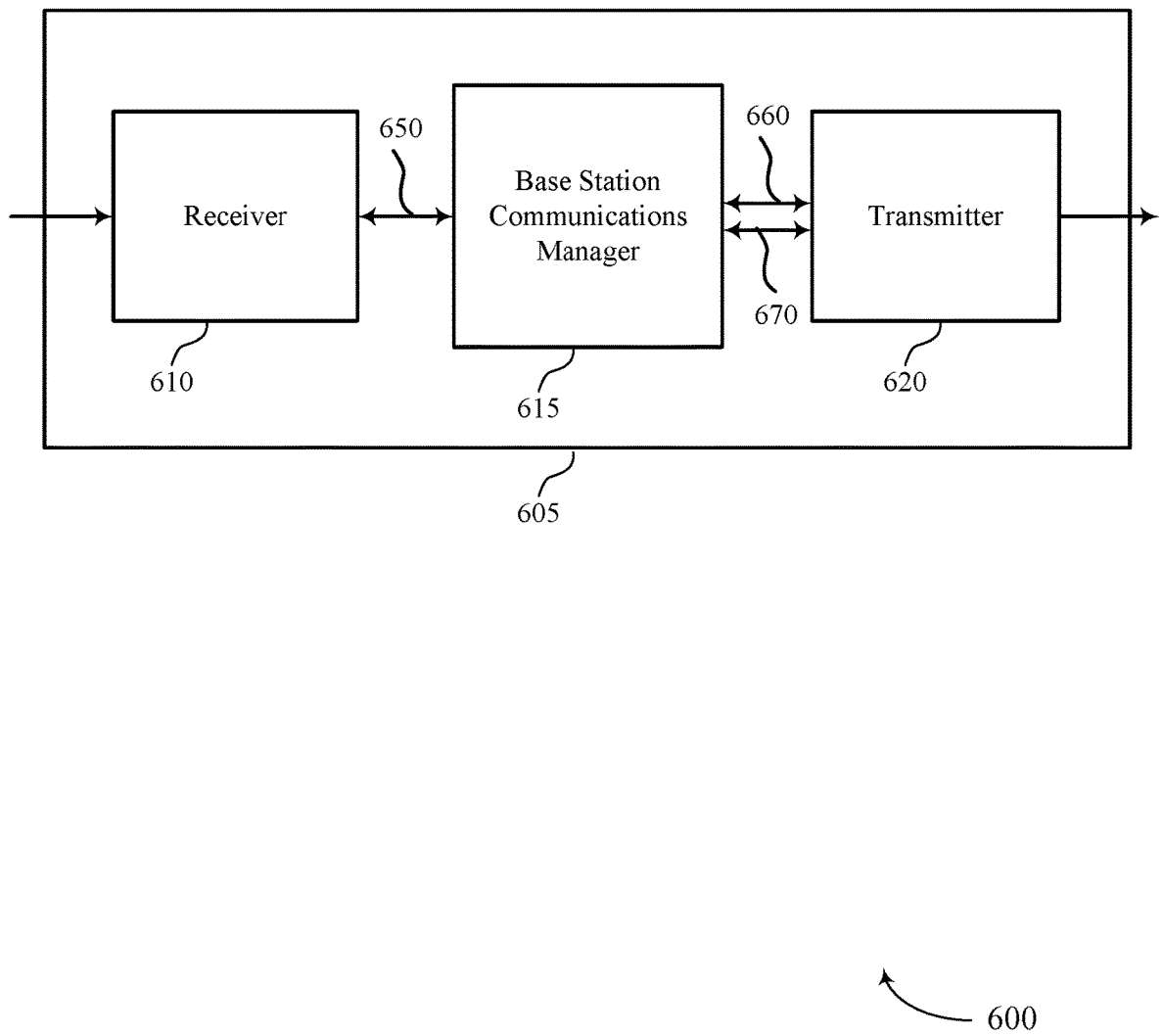
FIGS. 6 through 8 illustrate block diagrams of a device that supports RLM based on multiple reference signals in accordance with various aspects of the present disclosure.

FIG. 6 shows a block diagram 600 of a wireless device 605 that supports RLM based on multiple reference signals in accordance with various aspects of the present disclosure. Wireless device 605 may be an example of aspects of a base station 105 as described herein. Wireless device 605 may include receiver 610, base station communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to RLM based on multiple reference signals, etc.). Information may be passed on to other components of the device. The receiver 610 may be an example of aspects of the transceiver 935 described with reference to FIG. 9. The receiver 610 may utilize a single antenna or a set of antennas.

Base station communications manager 615 may be an example of aspects of the base station communications manager 915 described with reference to FIG. 9. Base station communications manager 615 and/or at least some of its various sub-components may be implemented in hardware, software executed by a processor, firmware, or any combination thereof. If implemented in software executed by a processor, the functions of the base station communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The base station communications manager 615 may receive, via receiver 610, information 650 such as cell quality metrics from a UE. In some examples, the cell quality metrics may be for different types of reference signals. In one example, information 650 may include cell quality metrics reported regarding a first type of reference signal. In another example, information 650 may include cell quality metrics reported regarding a second type of reference signal. The base station communications manager 615 may process the cell quality metrics of the first and second types of reference signals to determine which type of reference signal the UE is to be configured to use. Base station communications manager 615 may then transmit, via transmitter 620, an RLM configuration 660 to the UE. The RLM configuration 660 may include an RLM function which may indicate to the UE what reference signal types and thresholds are to be used in RLM.

In one example, the wireless device 605 may be a base station that may transmit reference signals 670, such as a first type of reference signal and a second type of reference signal. The first type of reference signal may be a synchronization signal (e.g., NR synchronization signal (NR-SS)) and the second type of reference signal may be a CSI-RS. Additionally, the first type of reference signal may be a demodulation reference signal and the second type of reference signal may be a UE-specific reference signal. Further, the first type of reference signal may be a non-beamformed reference signal (e.g., non-beamformed CSI-RS) and the second type of reference signal may be a beamformed reference signal (e.g., beamformed CSI-RS).

The wireless device 605 may also transmit an indication of, a number of antenna ports for the UE to use to receive these reference signals 670. In addition, the base station may transmit an indication of resources (e.g., time and frequency resources) for the UE to monitor for these types of reference signals. Further, wireless device 605 may also receive information 650 from the UE. Information 650 may be associated with a signal quality associated with the reference signals 670, such as signal quality including, but not limited to, reference signal received power (RSRP), reference signal received quality (RSRQ), SNR, and so forth. Based on the received information 650, the wireless device 605 may then transmit to the UE an RLM configuration 660.

Base station communications manager 615 may transmit reference signals 670, including a first type of reference signal and a second type of reference signal associated with a cell, identify, for a UE served by the base station, information 650 in the form of signal quality metrics associated with at least one of the first type of reference signal or the second type of reference signal, and configure the UE to use the first type of reference signal, the second type of reference signal, or both for RLM based on the identified quality metrics.

The base station communications manager 615 and/or at least some of its various sub-components may be physically located at various positions, including being distributed such that portions of functions are implemented at different physical locations by one or more physical devices. In some examples, base station communications manager 615 and/or at least some of its various sub-components may be a separate and distinct component in accordance with various aspects of the present disclosure. In other examples, base station communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Transmitter 620 may transmit reference signals and RLM configuration 660, some of which may be generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
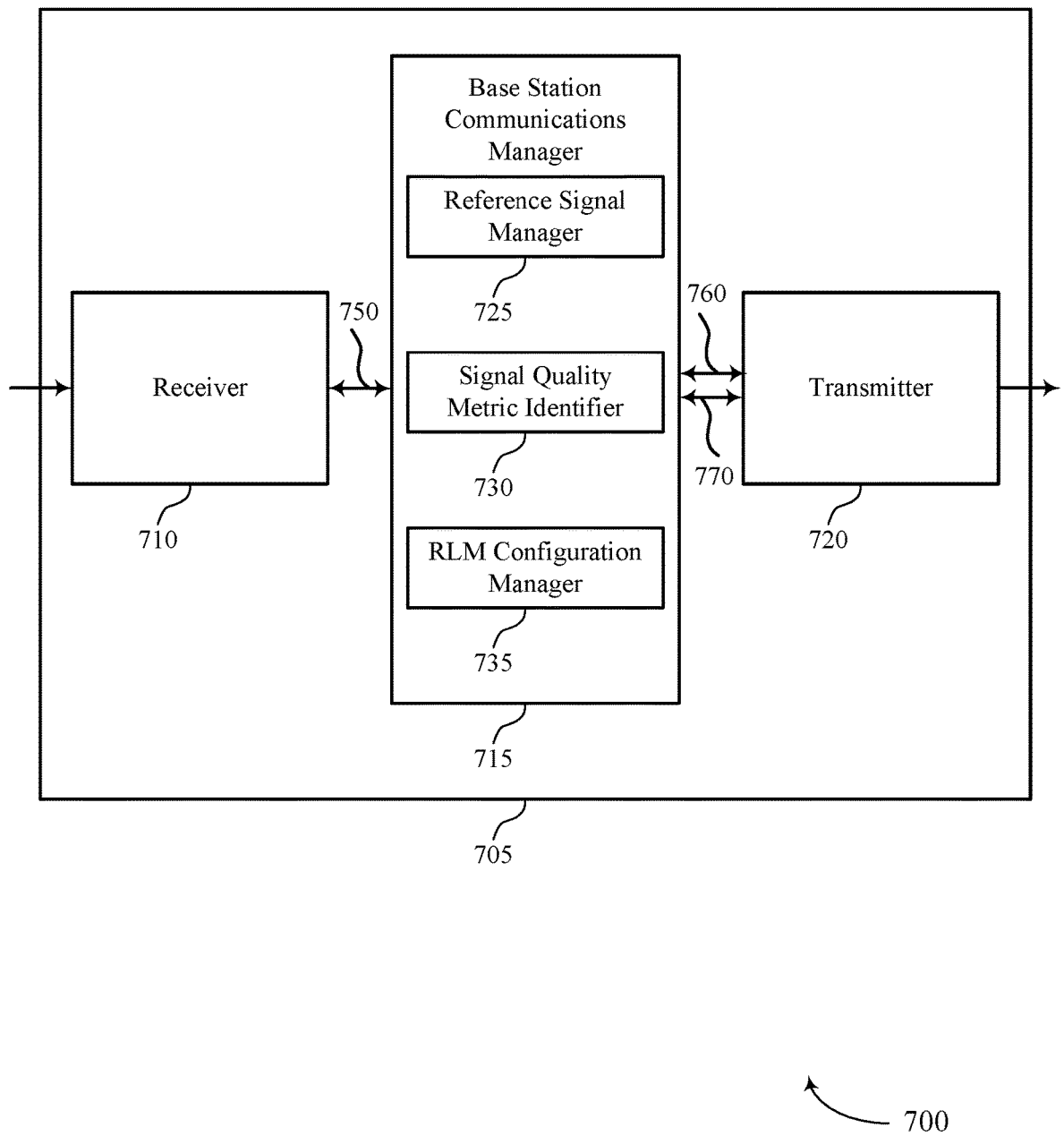

FIG. 7 shows a block diagram 700 of a wireless device 705 that supports RLM based on multiple reference signals in accordance with various aspects of the present disclosure. Wireless device 705 may be an example of aspects of a wireless device 605 or a base station 105 as described with reference to FIG. 6. Wireless device 705 may include receiver 710, base station communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to RLM based on multiple reference signals, etc.). Information may be passed on to other components of the device. The receiver 710 may be an example of aspects of the transceiver 935 described with reference to FIG. 9. The receiver 710 may utilize a single antenna or a set of antennas.

Base station communications manager 715 may be an example of aspects of the base station communications manager 915 described with reference to FIG. 9. Base station communications manager 715 may include reference signal manager 725, signal quality metric identifier 730, and RLM configuration manager 735.

Reference signal manager 725 may transmit references signals 770 in the form of a first type of reference signal and a second type of reference signal associated with a cell. In some cases, the first type of reference signal includes a synchronization signal and the second type of reference signal includes a channel state information reference signal. In some cases, the first type of reference signal includes a demodulation reference signal for a broadcast channel and the second type of reference signal includes a UE-specific reference signal. In some cases, the first type of reference signal includes a non-beamformed channel state information reference signal and the second type of reference signal includes a beamformed channel state information reference signal.

Signal quality metric identifier 730 may identify, for a UE served by the base station, signal quality metrics associated with at least one of the first type of reference signal or the second type of reference signal. The signal quality metrics may be received as information 750.

RLM configuration manager 735 may configure the UE to use the first type of reference signal, the second type of reference signal, or both for RLM based on the identified quality metrics. Thus, RLM configuration manager 735 may transmit, via transmitter 720, an RLM configuration 760 to the UE. In some cases, RLM configuration manager 735 may determine that the signal quality metric for the first type of reference signal is below a threshold. In some cases, RLM configuration manager 735 may configure the UE to use the first type of reference signal and the second type of reference signal for the RLM based on determining that the signal quality metric for the first type of reference signal is below the threshold. In some cases, RLM configuration manager 735 may determine that the signal quality metric associated with the first type of reference signal is above a threshold. In some cases, RLM configuration manager 735 may configure the UE to use the first type of reference signal for the RLM based on determining that the signal quality metric for the first type of reference signal is above the threshold.

In some cases, RLM configuration manager 735 may compare a difference between the signal quality metric associated with the first type of reference signal and the signal quality metric associated with the second type of reference signal to a threshold. In some cases, RLM configuration manager 735 may configure the UE to use the first type of reference signal, the second type of reference signal, or both for RLM based on a result of the comparing the difference to the threshold. In some cases, RLM configuration manager 735 may determine, based on the first and second signal quality metrics, a first cell quality metric associated with the first type of reference signal and a second cell quality metric associated with the second type of reference signal, where the first and second cell quality metrics include L3 mobility metrics. In some cases, RLM configuration manager 735 may compare a difference between the first cell quality metric associated with the first type of reference signal and the second cell quality metric associated with the second type of reference signal to a threshold. In some cases, RLM configuration manager 735 may configure the UE to use the first type of reference signal, the second type of reference signal, or both for the RLM based on a result of the comparing the difference to the threshold.

In some cases, RLM configuration manager 735 may measure a signal quality of the first type of SRS, determine that the measured signal quality of the first type of SRS is below a signal quality threshold, configure the UE to use the second type of reference signal for RLM based on determining that the measured signal quality of the first type of SRS is below the signal quality threshold. In some cases, RLM configuration manager 735 may configure the UE to use the second type of reference signal for the RLM when the UE is operating in a DRX mode.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
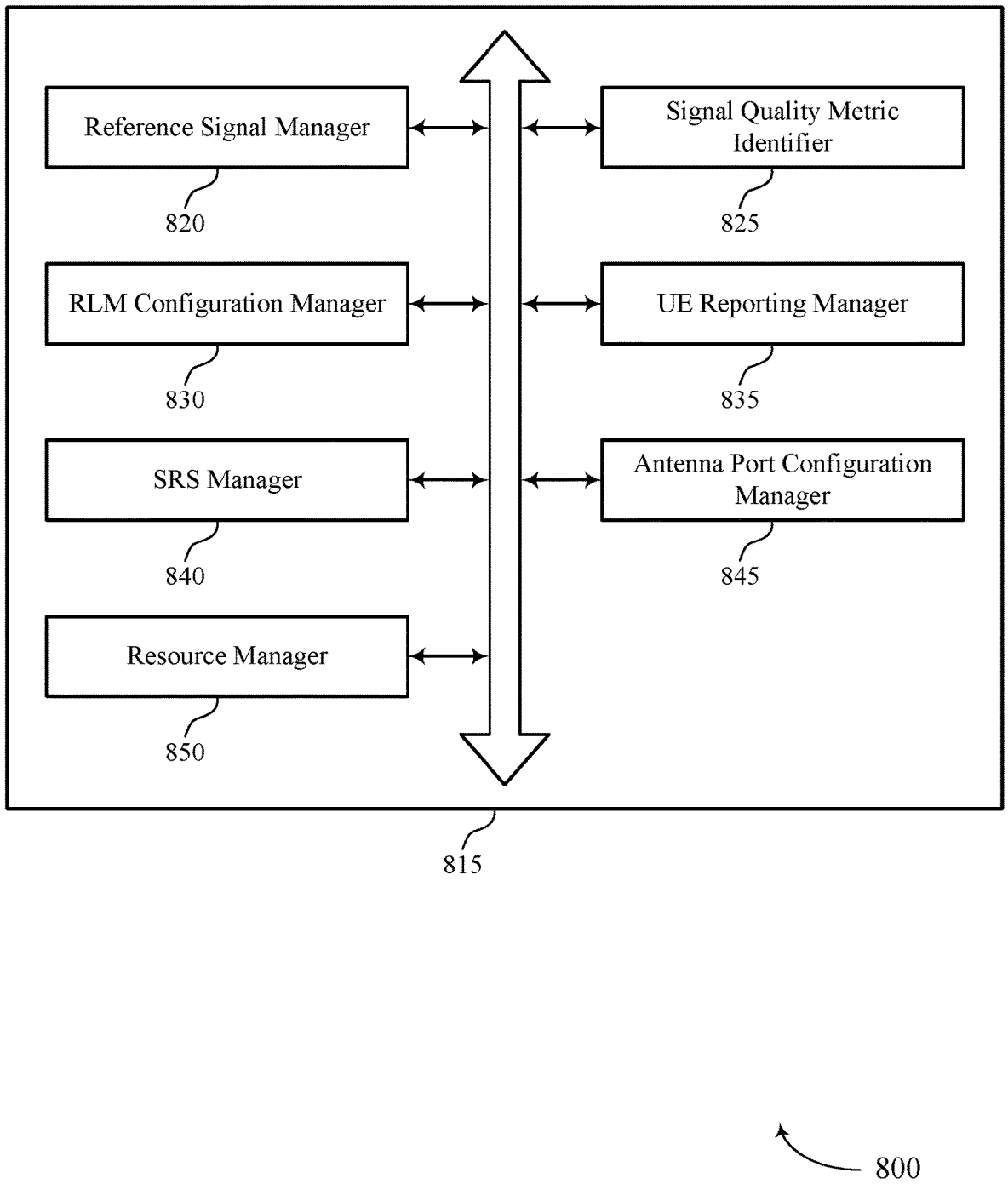

FIG. 8 shows a block diagram 800 of a base station communications manager 815 that supports RLM based on multiple reference signals in accordance with various aspects of the present disclosure. The base station communications manager 815 may be an example of aspects of a base station communications manager 615, a base station communications manager 715, or a base station communications manager 915 described with reference to FIGS. 6, 7, and 9. The base station communications manager 815 may include reference signal manager 820, signal quality metric identifier 825, RLM configuration manager 830, UE reporting manager 835, SRS manager 840, antenna port configuration manager 845, and resource manager 850. Each of these modules may communicate, directly or indirectly, with one another (e.g., via one or more buses).

Reference signal manager 820 may transmit a first type of reference signal and a second type of reference signal associated with a cell. In some cases, the first type of reference signal includes a synchronization signal and the second type of reference signal includes a channel state information reference signal. In some cases, the first type of reference signal includes a demodulation reference signal for a broadcast channel and the second type of reference signal includes a UE-specific reference signal. In some cases, the first type of reference signal includes a non-beamformed channel state information reference signal and the second type of reference signal includes a beamformed channel state information reference signal. Signal quality metric identifier 825 may identify, for a UE served by the base station, signal quality metrics associated with at least one of the first type of reference signal or the second type of reference signal.

RLM configuration manager 830 may configure the UE to use the first type of reference signal, the second type of reference signal, or both for RLM based on the identified quality metrics. In some cases, RLM configuration manager 830 may determine that the signal quality metric for the first type of reference signal is below a threshold. In some cases, RLM configuration manager 830 may configure the UE to use the first type of reference signal and the second type of reference signal for the RLM based on determining that the signal quality metric for the first type of reference signal is below the threshold. In some cases, RLM configuration manager 830 may determine that the signal quality metric associated with the first type of reference signal is above a threshold. In some cases, RLM configuration manager 830 may configure the UE to use the first type of reference signal for the RLM based on determining that the signal quality metric for the first type of reference signal is above the threshold.

In some cases, RLM configuration manager 830 may compare a difference between the signal quality metric associated with the first type of reference signal and the signal quality metric associated with the second type of reference signal to a threshold. In some cases, RLM configuration manager 830 may configure the UE to use the first type of reference signal, the second type of reference signal, or both for RLM based on a result of the comparing the difference to the threshold. In some cases, RLM configuration manager 830 may determine, based on the first and second signal quality metrics, a first cell quality metric associated with the first type of reference signal and a second cell quality metric associated with the second type of reference signal, where the first and second cell quality metrics include L3 mobility metrics. In some cases, RLM configuration manager 830 may compare a difference between the first cell quality metric associated with the first type of reference signal and the second cell quality metric associated with the second type of reference signal to a threshold. In some cases, RLM configuration manager 830 may configure the UE to use the first type of reference signal, the second type of reference signal, or both for the RLM based on a result of the comparing the difference to the threshold. In some cases, RLM configuration manager 830 may configure the UE to use the second type of reference signal for the RLM when the UE is operating in a DRX mode.

SRS manager 840 may configure the UE to transmit a first type of SRS derived from reception of the first type of reference signal and receive the first type of SRS from the UE. In some cases, a set of antenna ports used to receive the first type of SRS is quasi co-located with a set of antenna ports used to transmit the first type of reference signal. In some cases, RLM configuration manager 830 may measure a signal quality of the first type of SRS, determine that the measured signal quality of the first type of SRS is below a signal quality threshold, configure the UE to use the second type of reference signal for RLM based on determining that the measured signal quality of the first type of SRS is below the signal quality threshold.

UE reporting manager 835 may configure the UE to report a signal quality of the first type of reference signal and a signal quality of the second type of reference signal, where the signal quality metric for the first type of reference signal is identified based on receiving one or more reports of the signal quality of the first type of reference signal from the UE. Antenna port configuration manager 845 may transmit an indication of an antenna port configuration for the first type of reference signal and the second type of reference signal. Resource manager 850 may transmit an indication of resources for the UE to monitor for the first type of reference signal and the second type of reference signal.

Figure 9:
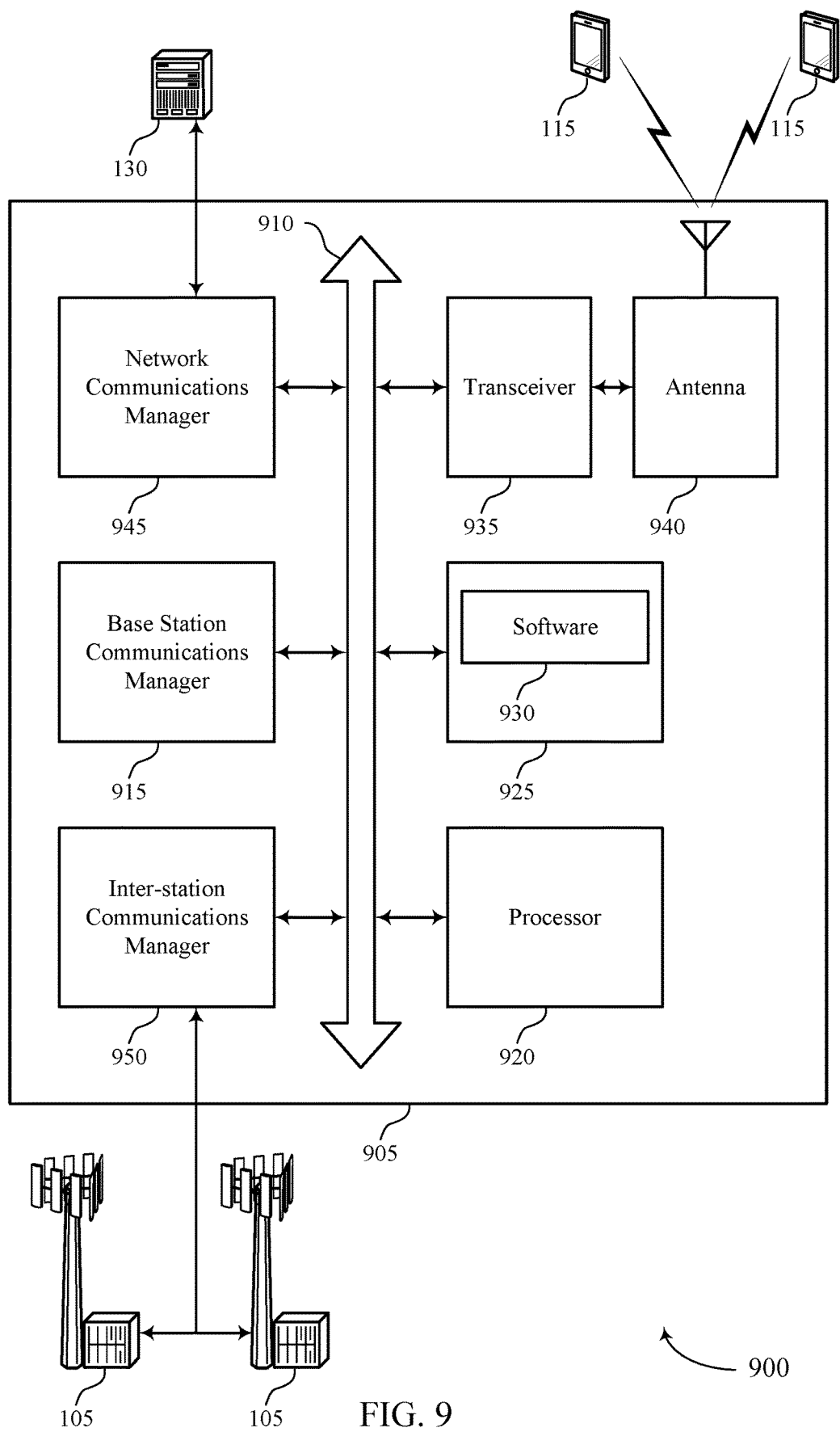
FIG. 9 illustrates a block diagram of a system including a base station that supports RLM based on multiple reference signals, in accordance with various aspects of the present disclosure.

FIG. 9 shows a diagram of a system 900 including a device 905 that supports RLM based on multiple reference signals in accordance with various aspects of the present disclosure. Device 905 may be an example of or include the components of wireless device 605, wireless device 705, or a base station 105 as described above, e.g., with reference to FIGS. 6 and 7. Device 905 may include components for bi-directional voice and data communications including components for transmitting and receiving communications, including base station communications manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting RLM based on multiple reference signals).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support RLM based on multiple reference signals. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions. Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an LTE/LTE-A wireless communication network technology to provide communication between base stations 105.

Figure 10:
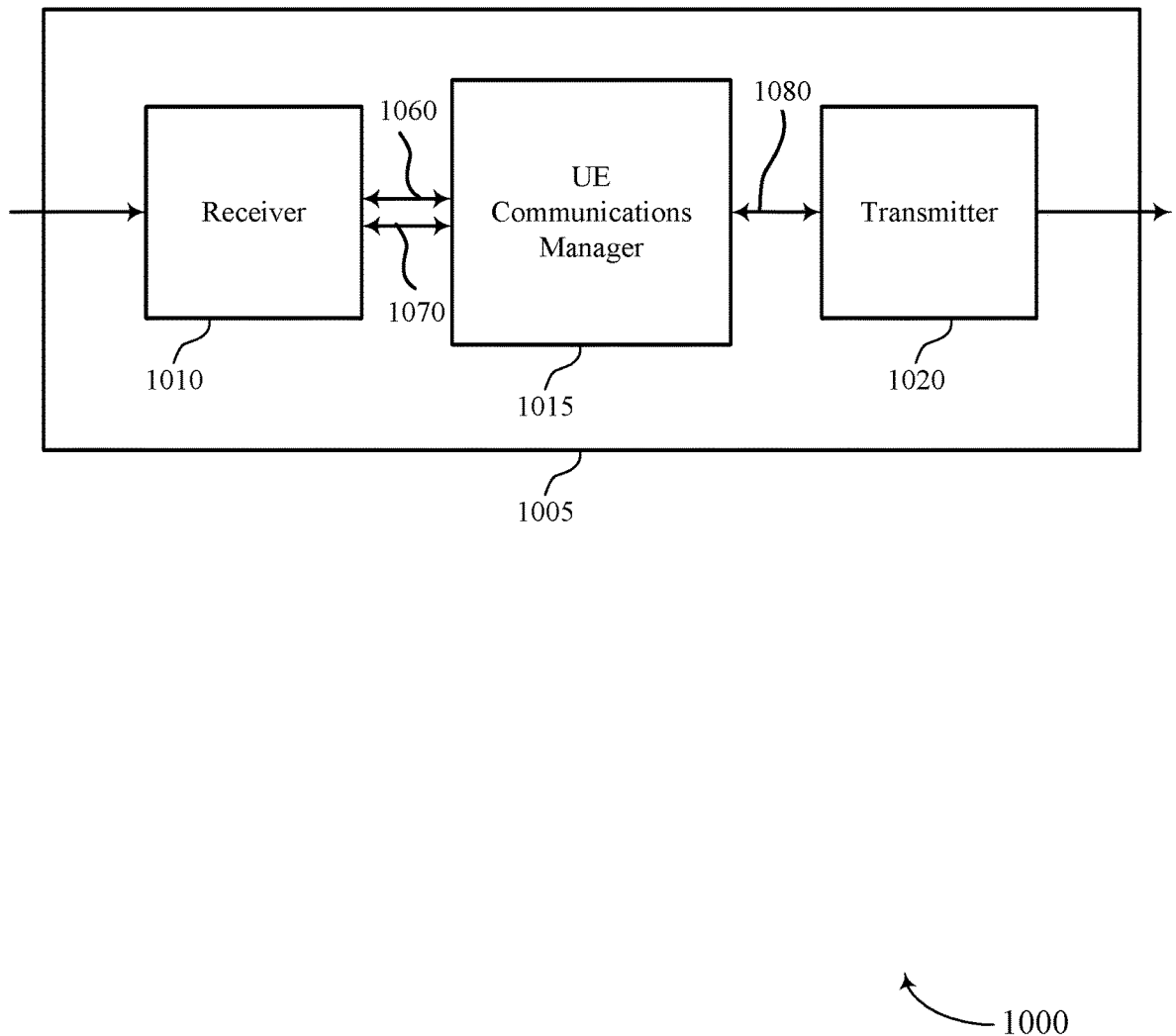
FIGS. 10 and 11 illustrate block diagrams of a device that supports RLM based on multiple reference signals in accordance with various aspects of the present disclosure.

FIG. 10 shows a block diagram 1000 of a wireless device 1005 that supports RLM based on multiple reference signals in accordance with various aspects of the present disclosure. Wireless device 1005 may be an example of aspects of a UE 115 as described herein. Wireless device 1005 may include receiver 1010, UE communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to RLM based on multiple reference signals, etc.). Information may be passed on to other components of the device. The receiver 1010 may be an example of aspects of the transceiver 1235 described with reference to FIG. 12. The receiver 1010 may utilize a single antenna or a set of antennas.

UE communications manager 1015 may be an example of aspects of the UE communications manager 1215 described with reference to FIG. 12. UE communications manager 1015 and/or at least some of its various sub-components may be implemented in hardware, software executed by a processor, firmware, or any combination thereof. If implemented in software executed by a processor, the functions of the UE communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The UE communications manager 1015 and/or at least some of its various sub-components may be physically located at various positions, including being distributed such that portions of functions are implemented at different physical locations by one or more physical devices. In some examples, UE communications manager 1015 and/or at least some of its various sub-components may be a separate and distinct component in accordance with various aspects of the present disclosure. In other examples, UE communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 1015 may receive reference signals 1060, from a base station serving the UE, the reference signals 1060 including a first type of reference signal and a second type of reference signal. UE communications manager 1015 may also receive, from the base station, an RLM configuration 1070 including a first signal quality threshold and an indicator that the UE is to apply, in an RLM function, the first signal quality threshold to at least one of the first type of reference signal or the second type of reference signal. UE communications manager 1015 may then determine a first signal quality of the first type of reference signal and a second signal quality of the second type of reference signal, determine whether the UE is in-sync or out-of-sync for communication with the base station based on the RLM function and at least one of the first signal quality or the second signal quality, and communicate with the base station based on the determination of whether the UE is in-sync or out-of-sync. In some cases, the communications with the base station may include the transmission of signal quality information 1080). The RLM configuration may include an RLM function which may indicate what reference signal types and thresholds to use in RLM.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

In one example, the wireless device 1005 may be a UE that may receive reference signals 1060 from a base station, such as a first type of reference signal and a second type of reference signal. The first type of reference signal may be a synchronization signal (e.g., NR synchronization signal (NR-SS)) and the second type of reference signal may be a CSI-RS. Additionally, the first type of reference signal may be a demodulation reference signal and the second type of reference signal may be a UE-specific reference signal. Further, the first type of reference signal may be a non-beamformed reference signal (e.g., non-beamformed CSI-RS) and the second type of reference signal may be a beamformed reference signal (e.g., beamformed CSI-RS).

The UE may then perform RLM based on one or both of the received signals. In some cases, the RLM may be based on signal quality metrics associated with the different types of reference signals received by the UE. Additionally, the UE may transmit signal quality information 1080, such as signal quality including, but not limited to, reference signal received power (RSRP), reference signal received quality (RSRQ), SNR, and so forth.

Figure 11:
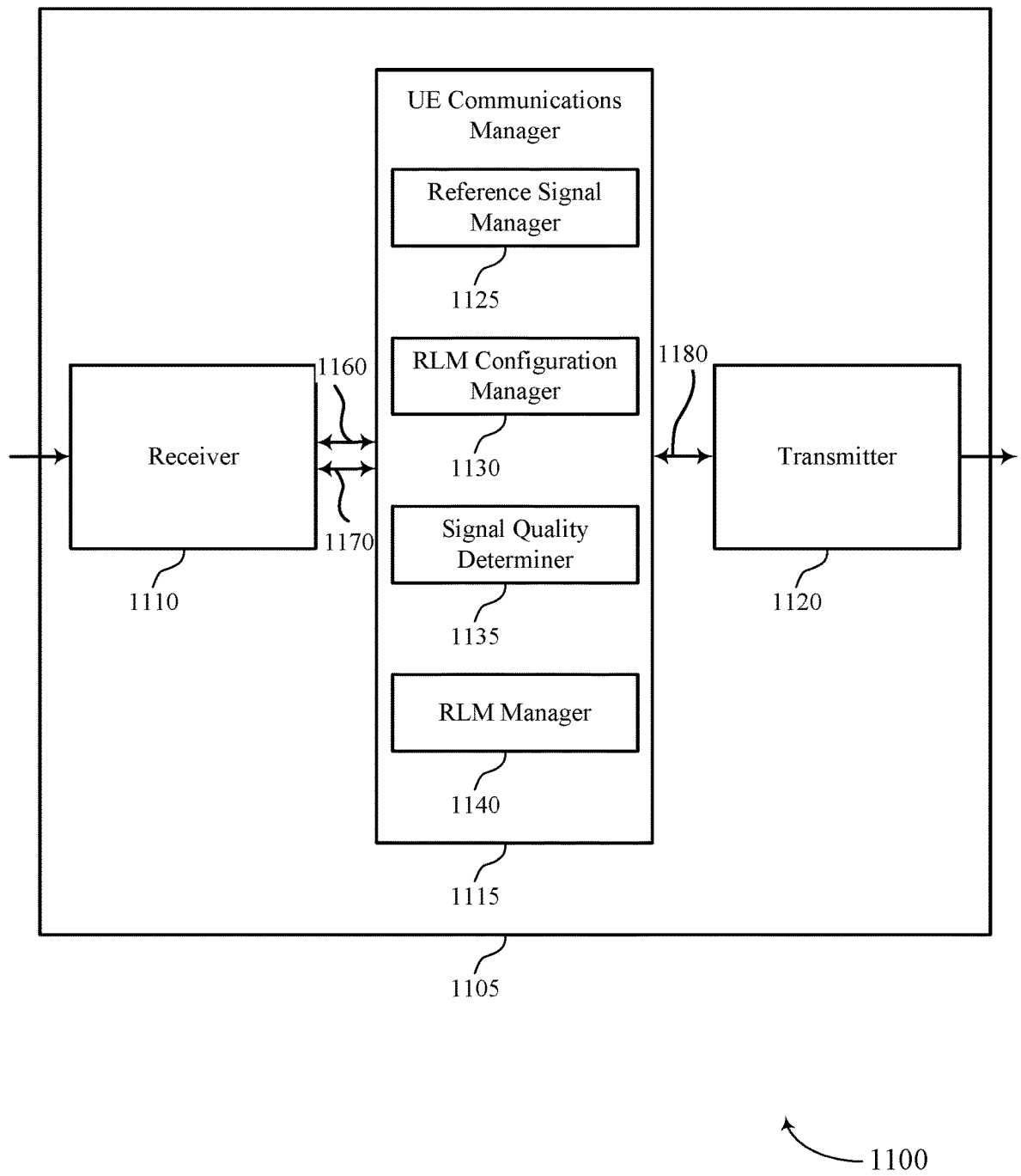

FIG. 11 shows a block diagram 1100 of a wireless device 1105 that supports RLM based on multiple reference signals in accordance with various aspects of the present disclosure. Wireless device 1105 may be an example of aspects of a wireless device 1005 or a UE 115 as described with reference to FIG. 10. Wireless device 1105 may include receiver 1110, UE communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to RLM based on multiple reference signals, etc.). Information may be passed on to other components of the device. The receiver 1110 may be an example of aspects of the transceiver 1235 described with reference to FIG. 12. The receiver 1110 may utilize a single antenna or a set of antennas.

UE communications manager 1115 may be an example of aspects of the UE communications manager 1215 described with reference to FIG. 12. UE communications manager 1115 may include reference signal manager 1125, RLM configuration manager 1130, signal quality determiner 1135, and RLM manager 1140.

Reference signal manager 1125 may receive, from a base station serving the UE, reference signals 1160 including a first type of reference signal and a second type of reference signal. In some cases, the first type of reference signal includes a synchronization signal and the second type of reference signal includes a channel state information reference signal. In some cases, the first type of reference signal includes a demodulation reference signal for a broadcast channel and the second type of reference signal includes a UE-specific reference signal. In some cases, the first type of reference signal includes a non-beamformed channel state information reference signal and the second type of reference signal includes a beamformed channel state information reference signal. RLM configuration manager 1130 may receive, from the base station, an RLM configuration 1170 including a first signal quality threshold and an indicator that the UE is to apply, in an RLM function, the first signal quality threshold to at least one of the first type of reference signal or the second type of reference signal. The RLM configuration 1170 may include an RLM function which may indicate what reference signal types and thresholds to use in RLM. Signal quality determiner 1135 may determine a first signal quality of the first type of reference signal and a second signal quality of the second type of reference signal.

RLM manager 1140 may determine whether the UE is in-sync or out-of-sync for communication with the base station based on the RLM function and at least one of the first signal quality or the second signal quality. RLM manager 1140 may then communicate with the base station based on the determination of whether the UE is in-sync or out-of-sync. In some cases, RLM manager 1140 may determine a maximum signal quality of the first signal quality and the second signal quality and determine whether the UE is in-sync or out-of-sync based on comparing the maximum signal quality to the first signal quality threshold. In some cases, RLM manager 1140 may determine a minimum block error rate based on the first signal quality and the second signal quality and determine whether the UE is in-sync or out-of-sync based on comparing the minimum block error rate to a configured block error rate threshold. In some cases, RLM manager 1140 may combine the first signal quality and the second signal quality and determine whether the UE is in-sync or out-of-sync based on comparing the combined signal quality to the first signal quality threshold. In some cases, the signal quality information 1180 may be reported to the base station.

In some cases, the RLM configuration 1170 includes a second signal quality threshold, and determining whether the UE is in-sync or out-of-sync includes determining that the UE is out-of-sync based on determining that the first signal quality is below the first signal quality threshold, or determining that the UE is out-of-sync based on determining that the first signal quality is below the first signal quality threshold and the second signal quality is below the second signal quality threshold. In some cases, the RLM configuration 1170 includes a second signal quality threshold, and determining whether the UE is in-sync or out-of-sync includes determining that the UE is in-sync based on determining that the first signal quality is above the first signal quality threshold, or determining that the UE is in-sync based on determining that the first signal quality is above the first signal quality threshold, or the second signal quality is above the second signal quality threshold, or both.

In some cases, RLM manager 1140 may determine that a periodicity of the first type of reference signal is greater than a periodicity threshold and determine whether the UE is in-sync or out-of-sync based on the second signal quality. In some cases, RLM manager 1140 may determine that a periodicity of the second type of reference signal is greater than a periodicity threshold and determine whether the UE is in-sync or out-of-sync based on the first signal quality.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1235 described with reference to FIG. 12. The transmitter 1120 may utilize a single antenna or a set of antennas.

Figure 12:
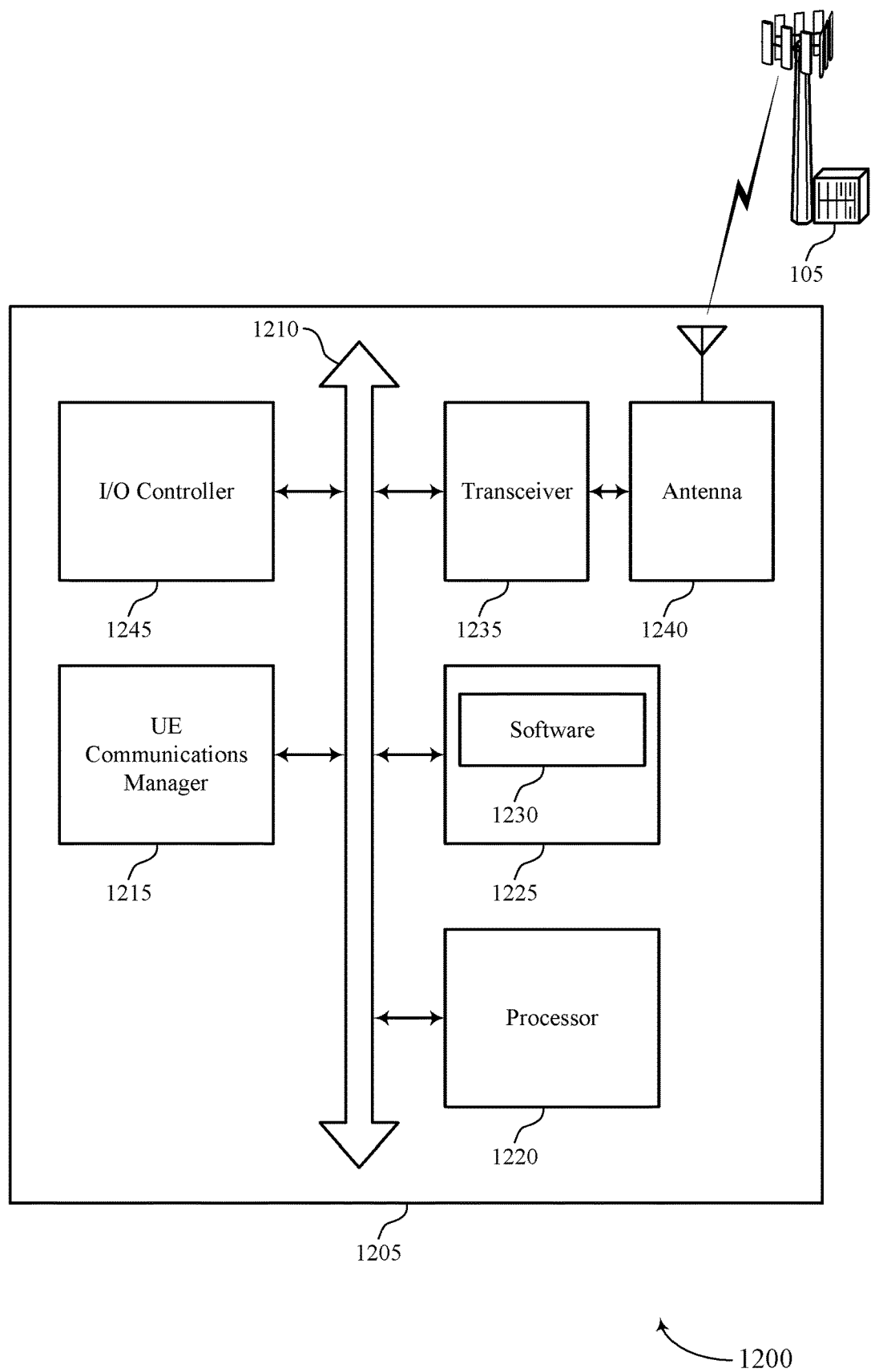
FIG. 12 illustrates a block diagram of a system including a user equipment (UE) that supports RLM based on multiple reference signals in accordance with various aspects of the present disclosure.

FIG. 12 shows a diagram of a system 1200 including a device 1205 that supports RLM based on multiple reference signals in accordance with various aspects of the present disclosure. Device 1205 may be an example of or include the components of UE 115 as described above, e.g., with reference to FIG. 1. Device 1205 may include components for bi-directional voice and data communications including components for transmitting and receiving communications, including UE communications manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting RLM based on multiple reference signals).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support RLM based on multiple reference signals. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
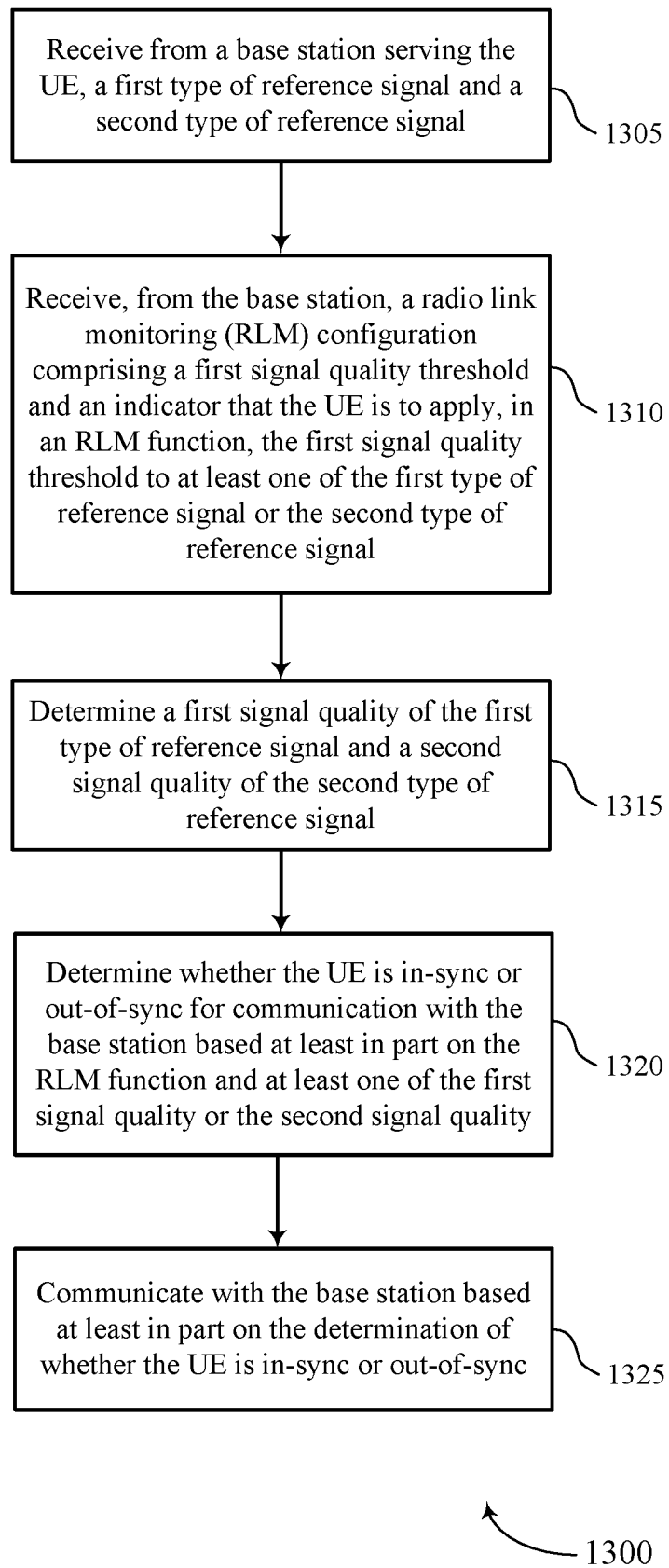
FIG. 13 illustrates a method for a device that supports RLM based on multiple reference signals in accordance with various aspects of the present disclosure.

FIG. 13 shows a flowchart illustrating a method 1300 for a wireless device that supports RLM based on multiple reference signals in accordance with various aspects of the present disclosure. The operations of method 1300 may be implemented by a UE or its components as described herein. For example, the operations of method 1300 may be performed by a UE as described with reference to FIGS. 2 through 5. In some examples, a wireless device may be an example of aspects of a UE 115 as described herein. Wireless devices may include at least a receiver, a UE communications manager, and a transmitter. Wireless devices may also include a processor. Each of these components may be in communication with one another (e.g., via one or more buses).

At block 1305 the UE may receive from a base station serving the UE, a first type of reference signal and a second type of reference signal. The first type of reference signal the base station may receive may be a synchronization signal (e.g., NR synchronization signal (NR-SS)) and the second type of reference signal the base station may receive may be a CSI-RS. Additionally, the first type of reference signal may be a demodulation reference signal and the second type of reference signal may be a UE-specific reference signal. Further, the first type of reference signal may be a non-beamformed reference signal (e.g., non-beamformed CSI-RS) and the second type of reference signal may be a beamformed reference signal (e.g., beamformed CSI-RS). The operations of block 1305 may be performed according to the methods described herein. In certain examples, aspects of the operations of block 1305 may be performed by a receiver and/or the reference signal manager as described with reference to FIG. 11. The first and second type of reference signals may be received by the receiver which may be part of a transceiver in the UE. The receiver may use a single antenna or a set of antennas.

At block 1310, the UE may receive, from the base station, a radio link monitoring (RLM) configuration comprising a first signal quality threshold and an indicator that the UE is to apply, in an RLM function, the first signal quality threshold to at least one of the first type of reference signal or the second type of reference signal. The operations of block 1310 may be performed according to the methods described herein. In certain examples, aspects of the operations of block 1310 may be performed by a receiver and/or the reference signal manager as described with reference to FIG. 11. In one example, the RLM configuration may include an RLM function. In the RLM function, the UE may determine a maximum signal quality of the first signal quality and the second signal quality, and the UE may determine whether the UE is in-sync or out-of-sync based on comparing the maximum signal quality (e.g., over a specified duration) to a signal quality threshold (e.g., which may be a preconfigured threshold or may be configured by base station).

At block 1315 the UE may determine a first signal quality of the first type of reference signal and a second signal quality of the second type of reference signal. The first and second signal quality for the first type of reference signal and/or the second type of reference signal may be, in one example, the reference signal received power (RSRP), reference signal received quality (RSRQ), SNR, and so forth. In some cases, the RLM configuration to determine signal quality may be a configuration of lower layers (e.g., layer 1 (L1) or layer 2 (L2)) responsible for beam management at the UE. In other cases, the RLM configuration to determine signal quality may be a configuration of upper layers (e.g., layer 3 (L3)) responsible for mobility at the UE. The operations of block 1315 may be performed according to the methods described herein. In certain examples, aspects of the operations of block 1315 may be performed by a signal quality determiner component as described with reference to FIG. 11.

At block 1320 the UE may determine whether the UE is in-sync or out-of-sync for communication with the base station based at least in part on the RLM function and at least one of the first signal quality or the second signal quality. The operations of block 1320 may be performed according to the methods described herein. In certain examples, aspects of the operations of block 1320 may be performed by an RLM manager as described with reference to FIG. 11. Stated generally, determining whether the UE may be in-sync or out-of-sync may include determining that the UE may be out-of-sync based at least in part on determining that the first signal quality may be below the first signal quality threshold, or determining that the UE may be out-of-sync based at least in part on determining that the first signal quality may be below the first signal quality threshold and the second signal quality may be below the second signal quality threshold. In one example, the UE may determine whether it is in-sync or out-of sync based on comparing the maximum signal quality (e.g., over a specified duration) to a signal quality threshold (e.g., which may be a preconfigured threshold or may be configured by a base station). In another example, the UE may determine whether it is in-sync or out-of-sync based on comparing the minimum BLER (e.g., over a specified duration) to a BLER threshold (e.g., configured by a base station). In yet another example, the UE may determine that it is out-of-sync based on determining that the first signal quality is below a first signal quality threshold.

At block 1325 the UE may communicate with the base station based at least in part on the determination of whether the UE is in-sync or out-of-sync. The operations of block 1325 may be performed according to the methods described herein. In certain examples, aspects of the operations of block 1325 may be performed by an RLM manager as described with reference to FIG. 11. Generally, the UE may determine whether it is in-sync or out-of-sync for communication with base station based on the RLM configuration received from base station and/or the first signal quality, the second signal quality, or both.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or a 5G system may be described for purposes of example, and LTE or 5G terminology may be used in much of the description, the techniques described herein are applicable beyond LTE or 5G applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a base station serving the UE, a first type of reference signal and a second type of reference signal;
   receiving, from the base station, a radio link monitoring (RLM) configuration comprising a block error rate threshold and an indicator that the UE is to apply, in an RLM function, the block error rate threshold to both the first type of reference signal and the second type of reference signal;
   determining a first signal quality of the first type of reference signal and a second signal quality of the second type of reference signal;
   determining that the UE is out-of-sync for communication with the base station based at least in part on both the first signal quality and the second signal quality being below a first signal quality threshold that corresponds to the block error rate threshold; and
   recovering base station communications based at least in part on the determination that the UE is out-of-sync.

2. The method of claim 1, wherein determining that the UE is out-of-sync comprises:
   determining a higher of the first signal quality and the second signal quality; and
   determining that the UE is out-of-sync based at least in part on the higher of the first signal quality and the second signal quality being below the first signal quality threshold.

3. The method of claim 1, wherein determining that the UE is out of sync comprises:
   determining that the UE is out-of-sync based at least in part on both a first block error rate associated with the first signal quality and a second block error rate associated with the second signal quality being above the block error rate threshold.

4. The method of claim 1, further comprising:
   combining the first signal quality and the second signal quality; and
   determining whether the UE is in-sync or out-of-sync based at least in part on comparing the combined signal quality to the first signal quality threshold.

5. The method of claim 1, further comprising:
   determining that a periodicity of the first type of reference signal is greater than a periodicity threshold; and
   determining whether the UE is in-sync or out-of-sync based at least in part on the second signal quality.

6. The method of claim 1, further comprising:
   determining that a periodicity of the second type of reference signal is greater than a periodicity threshold; and
   determining whether the UE is in-sync or out-of-sync based at least in part on the first signal quality.

7. The method of claim 1, wherein the RLM configuration comprises a second signal quality threshold, and wherein determining whether the UE is in-sync or out-of-sync comprises:
   determining that the UE is out-of-sync based at least in part on determining that the first signal quality is below the first signal quality threshold; or
   determining that the UE is out-of-sync based at least in part on determining that the first signal quality is below the first signal quality threshold and the second signal quality is below the second signal quality threshold.

8. The method of claim 1, wherein the RLM configuration comprises a second signal quality threshold, and wherein determining whether the UE is in-sync or out-of-sync comprises:
   determining that the UE is in-sync based at least in part on determining that the first signal quality is above the first signal quality threshold; or
   determining that the UE is in-sync based at least in part on determining that the first signal quality is above the first signal quality threshold, or the second signal quality is above the second signal quality threshold, or both.

9. The method of claim 1, wherein the first type of reference signal comprises a synchronization signal and the second type of reference signal comprises a channel state information reference signal.

10. The method of claim 1, wherein the first type of reference signal comprises a demodulation reference signal for a broadcast channel and the second type of reference signal comprises a UE-specific reference signal.

11. The method of claim 1, wherein the first type of reference signal comprises a non-beamformed channel state information reference signal and the second type of reference signal comprises a beamformed channel state information reference signal.

12. An apparatus for wireless communication at a user equipment (UE), comprising:
means for receiving, from a base station serving the UE, a first type of reference signal and a second type of reference signal;
means for receiving, from the base station, a radio link monitoring (RLM) configuration comprising a block error rate threshold and an indicator that the UE is to apply, in an RLM function, the block error rate threshold to both the first type of reference signal and the second type of reference signal;
means for determining a first signal quality of the first type of reference signal and a second signal quality of the second type of reference signal;
means for determining that the UE is out-of-sync for communication with the base station based at least in part on both the first signal quality and the second signal quality being below a first signal quality threshold that corresponds to the block error rate threshold; and
means for recovering base station communications based at least in part on the determination that the UE is out-of-sync.

13. The apparatus of claim 12, wherein the means for determining that the UE is out-of-sync comprises:
means for determining a higher of the first signal quality and the second signal quality; and
means for determining that the UE is out-of-sync based at least in part on the higher of the first signal quality and the second signal quality being below the first signal quality threshold.

14. The apparatus of claim 12, wherein the means for determining that the UE is out of sync comprises:
means for determining that the UE is out-of-sync based at least in part on both a first block error rate associated with the first signal quality and a second block error rate associated with the second signal quality being above the block error rate threshold.

15. The apparatus of claim 12, further comprising:
means for combining the first signal quality and the second signal quality; and
means for determining whether the UE is in-sync or out-of-sync based at least in part on comparing the combined signal quality to the first signal quality threshold.

16. The apparatus of claim 12, further comprising:
means for determining that a periodicity of the first type of reference signal is greater than a periodicity threshold; and
means for determining whether the UE is in-sync or out-of-sync based at least in part on the second signal quality.

17. The apparatus of claim 12, further comprising:
means for determining that a periodicity of the second type of reference signal is greater than a periodicity threshold; and
means for determining whether the UE is in-sync or out-of-sync based at least in part on the first signal quality.

18. The apparatus of claim 12, wherein the RLM configuration comprises a second signal quality threshold, and wherein the means for determining whether the UE is in-sync or out-of-sync comprises:
means for determining that the UE is out-of-sync based at least in part on determining that the first signal quality is below the first signal quality threshold; or
means for determining that the UE is out-of-sync based at least in part on determining that the first signal quality is below the first signal quality threshold and the second signal quality is below the second signal quality threshold.

19. An apparatus for wireless communication at a user equipment (UE), comprising:
a processor;
memory in electronic communication with the processor; and
instructions stored in the memory and operable, when executed by the processor, to cause the apparatus to:
receive, from a base station serving the UE, a first type of reference signal and a second type of reference signal;
receive, from the base station, a radio link monitoring (RLM) configuration comprising a block error rate threshold and an indicator that the UE is to apply, in an RLM function, the block error rate threshold to both the first type of reference signal and the second type of reference signal;
determine a first signal quality of the first type of reference signal and a second signal quality of the second type of reference signal;
determine that the UE is out-of-sync for communication with the base station based at least in part on both the first signal quality and the second signal quality being below a first signal quality threshold that corresponds to the block error rate threshold; and
recover base station communications based at least in part on the determination that the UE is out-of-sync.

20. The apparatus of claim 19, wherein the instructions to determine that the UE is out-of-sync are executable by the processor to cause the apparatus to:
determine a higher of the first signal quality and the second signal quality; and
determine that the UE is out-of-sync based at least in part on the higher of the first signal quality and the second signal quality being below the first signal quality threshold.

21. The apparatus of claim 19, wherein the instructions to determine that the UE is out of sync are executable by the processor to cause the apparatus to:
determine that the UE is out-of-sync based at least in part on both a first block error rate associated with the first signal quality and a second block error rate associated with the second signal quality being above the block error rate threshold.

22. The apparatus of claim 19, wherein the instructions are further executable by the processor to cause the apparatus to:
combine the first signal quality and the second signal quality; and
determine whether the UE is in-sync or out-of-sync based at least in part on comparing the combined signal quality to the first signal quality threshold.

23. The apparatus of claim 19, wherein the instructions are further executable by the processor to cause the apparatus to:

determine that a periodicity of the first type of reference signal is greater than a periodicity threshold; and
determine whether the UE is in-sync or out-of-sync based at least in part on the second signal quality.

24. The apparatus of claim 19, wherein the instructions are further executable by the processor to cause the apparatus to:
determine that a periodicity of the second type of reference signal is greater than a periodicity threshold; and
determine whether the UE is in-sync or out-of-sync based at least in part on the first signal quality.

25. The apparatus of claim 19, wherein the RLM configuration comprises a second signal quality threshold, and wherein the instructions are further executable by the processor to cause the apparatus to:
determine that the UE is out-of-sync based at least in part on determining that the first signal quality is below the first signal quality threshold; or
determine that the UE is out-of-sync based at least in part on determining that the first signal quality is below the first signal quality threshold and the second signal quality is below the second signal quality threshold.

26. The apparatus of claim 19, wherein the RLM configuration comprises a second signal quality threshold, and wherein the instructions are further executable by the processor to cause the apparatus to:
determine that the UE is in-sync based at least in part on determining that the first signal quality is above the first signal quality threshold; and
determine that the UE is in-sync based at least in part on determining that the first signal quality is above the first signal quality threshold, or the second signal quality is above the second signal quality threshold, or both.

27. The apparatus of claim 19, wherein the first type of reference signal comprises a synchronization signal and the second type of reference signal comprises a channel state information reference signal.

28. The apparatus of claim 19, wherein the first type of reference signal comprises a demodulation reference signal for a broadcast channel and the second type of reference signal comprises a UE-specific reference signal.

29. The apparatus of claim 19, wherein the first type of reference signal comprises a non-beamformed channel state information reference signal and the second type of reference signal comprises a beamformed channel state information reference signal.

30. A non-transitory computer readable medium storing code for wireless communication at a user equipment (UE), the code comprising instructions executable by a processor to:
receive, from a base station serving the UE, a first type of reference signal and a second type of reference signal;
receive, from the base station, a radio link monitoring (RLM) configuration comprising a block error rate threshold and an indicator that the UE is to apply, in an RLM function, the block error rate threshold to both the first type of reference signal and the second type of reference signal;
determine a first signal quality of the first type of reference signal and a second signal quality of the second type of reference signal;
determine that the UE is out-of-sync for communication with the base station based at least in part on both the first signal quality and the second signal quality being below a first signal quality threshold that corresponds to the block error rate threshold; and
recover base station communications based at least in part on the determination that the UE is out-of-sync.

* * * * *